US008310416B2

(12) United States Patent
Yatabe et al.

(10) Patent No.: US 8,310,416 B2

(45) Date of Patent: Nov. 13, 2012

(54) METHOD OF DRIVING PIXEL CIRCUIT, LIGHT-EMITTING APPARATUS, AND ELECTRONIC APPARATUS

(75) Inventors: Satoshi Yatabe, Shiojiri (JP); Hideto Ishiguro, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 620 days.

(21) Appl. No.: 12/499,485

(22) Filed: Jul. 8, 2009

(65) Prior Publication Data

US 2010/0039411 A1 Feb. 18, 2010

(30) Foreign Application Priority Data

Aug. 18, 2008 (JP) ................................ 2008-209520
Sep. 26, 2008 (JP) ................................ 2008-247524

(51) Int. Cl.
*G09G 3/30* (2006.01)
*G09G 5/00* (2006.01)
*G06F 3/038* (2006.01)

(52) U.S. Cl. ........................................ 345/77; 345/204

(58) Field of Classification Search ........................ None
See application file for complete search history.

(56) References Cited

U.S. PATENT DOCUMENTS 7,808,008 B2 * 10/2010 Miyake .......................... 257/80
2003/0160753 A1 * 8/2003 McCartney .................... 345/99
2005/0206590 A1 * 9/2005 Sasaki et al. .................... 345/76
2005/0269959 A1 * 12/2005 Uchino et al. ............ 315/169.3
2007/0247398 A1 * 10/2007 Nathan et al. .................. 345/82
2007/0268210 A1 11/2007 Uchino et al.
2008/0001545 A1 * 1/2008 Uchino et al. ................ 315/175
2008/0042948 A1 * 2/2008 Yamashita et al. ............. 345/82
2009/0153448 A1 * 6/2009 Tomida et al. ................. 345/82

FOREIGN PATENT DOCUMENTS

JP A-2007-310311 11/2007

* cited by examiner

*Primary Examiner* — Amare Mengistu
*Assistant Examiner* — Antonio Xavier
(74) *Attorney, Agent, or Firm* — Oliff & Berridge, PLC

(57) ABSTRACT

There is provided a method of driving a pixel circuit. The method includes: performing a compensating operation of asymptotically causing the voltage across the storage capacitance to converge with a voltage corresponding to a threshold voltage of the driving transistor by applying a first reference voltage to the gate of the driving transistor, over a time duration variably set according to a gradation value designated to the pixel circuit, in a compensating period after the elapse of the resetting period; changing the voltage across the storage capacitance from a voltage set by the compensating operation to a voltage corresponding to the gradation value by applying a gradation voltage corresponding to the gradation value from a signal line to the gate of the driving transistor, in a writing period after the elapse of the compensating period.

8 Claims, 23 Drawing Sheets

■ RESETTING PERIOD PRS

■ COMPENSATING PERIOD PCP (OPERATING PERIOD PCP1)

■ COMPENSATING PERIOD PCP
(SUSTAINING PERIOD PCP2)

■ WRITING PERIOD PWR

■ RESETTING PERIOD PRS

■ COMPENSATING PERIOD PCP (OPERATING PERIOD PCP1)

■ COMPENSATING PERIOD PCP
(SUSTAINING PERIOD PCP2)

■ WRITING PERIOD PWR

METHOD OF DRIVING PIXEL CIRCUIT, LIGHT-EMITTING APPARATUS, AND ELECTRONIC APPARATUS

BACKGROUND

1. Technical Field

The present invention relates to a light-emitting device such as an organic EL (electroluminescence) device.

2. Related Art

Light-emitting apparatuses where a driving transistor controls an amount of a driving current supplied to a light-emitting device suffer from errors (differences from a target value or non-uniformity between devices) in the electric characteristics of the driving transistor or the light-emitting device. Patent Document JP-A-2007-310311 discloses a technique for compensating for errors in the threshold voltage and mobility (furthermore, errors in the amount of driving current) of a driving transistor by setting a voltage across a storage capacitance interposed between a gate and a source of the driving transistor as the threshold voltage of the driving transistor and changing the voltage across the storage capacitance to a voltage corresponding to a gradation value. However, in Patent Document JP-A-2007-310311, the errors in the driving current may be effectively compensated only in the cases where a gradation value is specifically designated. Therefore, errors in the driving current in some gradation values may not be removed.

SUMMARY

An advantage of some aspects of the invention is to suppress errors in the driving current in a plurality of gradation values.

According to an aspect of the invention, there is provided a method of driving a pixel circuit including a light-emitting device, a driving transistor serially connected to the light-emitting device, and a storage capacitance interposed between a path between the light-emitting device and the driving transistor and a gate of the driving transistor, comprising: turning on the driving transistor by resetting a voltage across the storage capacitance in a resetting period; performing a compensating operation of asymptotically causing the voltage across the storage capacitance to converge with a voltage corresponding to a threshold voltage of the driving transistor by applying a first reference voltage (for example, a reference voltage VREF1 of FIG. 3) to the gate of the driving transistor over a time duration (for example, a time duration t1 of FIG. 3) variably set according to a gradation value designated to the pixel circuit in a compensating period after the elapse of the resetting period; changing the voltage across the storage capacitance from a voltage set by the compensating operation to a voltage corresponding to the gradation value by applying a gradation voltage corresponding to the gradation value from a signal line to the gate of the driving transistor in a writing period after the elapse of the compensating period; and supplying a driving current corresponding to the voltage across the storage capacitance to the light-emitting device by stopping applying a voltage to the gate of the driving transistor in a driving period after the elapse of the writing period. In the above method, since the time duration of the compensating operation is variably set according to the gradation value (or gradation voltage), it is possible to effectively suppress errors in the driving current with respect to a plurality of gradation values.

For example, by taking into consideration the tendency that the time duration of the compensating operation that can effectively reduce errors in the driving current is decreased in an inverse proportion to an increase in a change of the gate voltage of the driving transistor due to the application of the gradation voltage (for example, in an inverse proportion to an increase in a gradation voltage VDATA of FIG. 3), the time duration of the compensating operation in the compensating period is set so that the time duration of the compensating operation is decreased in an inverse proportion to an increase in the change of the gate voltage of the driving transistor due to the application of the gradation voltage.

In the aspect of the invention, in the compensating period, the compensating operation is performed by applying the first reference voltage from the signal line to the gate of the driving transistor, and the compensating operation is stopped by changing the first reference voltage of the signal line into a second reference voltage (for example, a reference voltage VREF2 of FIG. 3) to transition the driving transistor into an OFF state. According to the above method, since the starting and stopping of the compensating operation is controlled according to the voltage of the signal line, there is an advantage in that the time duration of the compensating operation can be adjusted by using a simple construction in comparison with a case where elements other than the signal line are used for controlling the compensating operation.

However, due to the tendency that the time duration of the compensating operation that can effectively reduce errors in the driving current is increased in an inverse proportion to a decrease in the gradation value, in order to completely reduce errors in the driving current even in the case of a low gradation value, there is a need for ensuring an excessively long time duration of the compensating operation. Therefore, in an aspect of the invention, in a case where the gradation value is lower than a predetermined value, the time duration of the compensating operation is set to a predetermined value that does not depends on the gradation value (that is, an upper limit of the time duration of the compensating operation is defined). According to the above method, even in case of a low gradation value, there is an advantage in that the time duration of the compensating operation can be suppressed to a suitable length.

In the aspect of the invention, in the writing period, current flowing in the driving transistor is blocked. According to the aspect, since the compensating operation is stopped in the writing period, there is an advantage in that, if the time duration of the compensating operation in the writing period is set with respect to every gradation voltage according to the relationship between the time duration of the compensating operation in the compensating period and the errors in the driving current, the errors in the driving current can be suppressed with a high accuracy. For example, a method where a control switch (for example, a control switch TCR of FIG. 16) disposed in the path of the driving transistor current is controlled to be in an OFF state in the writing period may be useful.

According to an another aspect of the invention, there is provided a method of driving a pixel circuit that includes a capacitance device having a first electrode and a second electrode, a P-channel driving transistor of which the gate is connected to the second electrode, and a light-emitting device, the method including: turning on the driving transistor by resetting the gate voltage of the driving transistor in a resetting period; performing a first compensating operation of asymptotically causing a gate-source voltage of the driving transistor to converge with a threshold voltage of the driving transistor by applying a first reference voltage to the first electrode so as to put the driving transistor in a diode connection state, over a time duration variably set according to a gradation value designated to the pixel circuit, in a compensating period after the elapse of the resetting period; changing the gate-source voltage of the driving transistor to a voltage corresponding to the gradation value by applying a gradation voltage corresponding to the gradation value from a signal line to the first electrode in a writing period after the elapse of the compensating period; and supplying a driving current corresponding to the gate-source voltage of the driving transistor to the light-emitting device in a driving period after the elapse of the writing period.

In the above method, since the time duration of the compensating operation (first compensating operation) in the compensating period is variably set according to the gradation value (or gradation voltage), it is possible to effectively suppress errors in the driving current in a plurality of the gradation values.

In the aspect of the invention, the method of driving a pixel circuit further includes performing a second compensating operation of changing the gate-source voltage of the driving transistor to the voltage corresponding to the gradation value and asymptotically causing the gate-source voltage to converge with the threshold voltage of the driving transistor by applying the gradation voltage to the first electrode while the driving transistor is in the diode connection state in the writing period. According to the aspect, since the compensating operation of asymptotically causing the gate-source voltage of the driving transistor to converge with the threshold voltage is performed in the writing period as well as the compensating period, it is possible to reduce the time duration of the compensating period in comparison with a construction where the compensating operation is not performed in the writing period.

In the aspect of the invention, one electrode (for example, an anode) of the light-emitting device is connected to a drain of the driving transistor. In the resetting period, the compensating period, and the writing period, the voltage across the light-emitting device is set to be lower than the threshold voltage of the light-emitting device by applying a first voltage to the other electrode (for example, a cathode) of the light-emitting device. In the driving period, the voltage across the light-emitting device is set to be higher than the threshold voltage of the light-emitting device by changing the first voltage applied to the other electrode of the light-emitting device to the second voltage. According to the aspect, since the ON and OFF states of the light-emitting device can be changed by changing the voltage applied to the other electrode of the light-emitting device, there is no need for disposing a switching device for determining whether or not to supply the driving current to the light-emitting device in the path of the driving current Therefore, there is an advantage in that the construction of the pixel circuit can be simplified.

In the aspect of the invention, a switching device is disposed in the path of the driving current, and the driving current is supplied to the light-emitting device by allowing the switching device to be in an OFF state in the compensating period and the writing period and allowing the switching device to be in an ON state in the driving period. According to the aspect, since the switching device is in the OFF state in the compensating period and the writing period, the light-emitting device can be reliably put in the OFF state (non-emitting state) without changing the voltage of the electrode in the light-emitting device.

In the above aspect, by taking into consideration the tendency that the time duration of the first compensating operation in the compensating period is decreased in an inverse proportion to an increase in a change of the gate voltage of the driving transistor due to the application of the gradation voltage, the time duration of the first compensating operation in the compensating period is set so that the time duration of the first compensating operation is decreased in an inverse proportion to an increase in the change of the gate voltage of the driving transistor due to the application of the gradation voltage.

In addition, in the above aspect, in the compensating period, the first compensating operation may be performed by applying the first reference voltage from the signal line to the first electrode, and the first compensating operation may be stopped by changing the first reference voltage of the signal line to the second reference voltage to transition the driving transistor into the OFF state. In the aspect, since the signal line is also used for the driving (that is, performing and stopping the first compensating operation) of the pixel circuit in the compensating period, there is an advantage in that the construction can be simplified due to a reduction in the number of lines in comparison with a construction in which lines for driving the pixel circuit in the compensating period are provided separately from the signal line.

However, under the tendency that the time duration of the compensating operation that can effectively reduce the errors in the driving current is increased in an inverse proportion to a decrease in the gradation value, in order to completely reduce the errors in the driving current even in the case of a low gradation value, there is a need for ensuring an excessively long time duration of the compensating operation. Therefore, in an aspect of the invention, in a case where the gradation value is lower than a predetermined value, the time duration of the compensating operation is set to a predetermined value that does not depend on the gradation value (that is, an upper limit of the time duration of the compensating operation is defined). According to the above method, even in the case of a low gradation value, there is an advantage in that the time duration of the compensating operation can be suppressed to a suitable length.

According to a still another aspect of the invention, there is provided a light-emitting apparatus including: a pixel circuit including a light-emitting device, a driving transistor serially connected to the light-emitting device, and a storage capacitance interposed between a path between the driving transistor and the light-emitting device and a gate of the driving transistor; and a driving circuit that drives the pixel circuit. The driving circuit turns on the driving transistor by resetting a voltage across the storage capacitance in a resetting period, performs a compensating operation of asymptotically causing the voltage across the storage capacitance to converge with a voltage corresponding to a threshold voltage of the driving transistor by applying a first reference voltage to the gate of the driving transistor, over a time duration variably set according to a gradation value designated to the pixel circuit, in a compensating period after the elapse of the resetting period; changes the voltage across the storage capacitance from a voltage set by the compensating operation to a voltage corresponding to the gradation value by applying a gradation voltage corresponding to the gradation value from a signal line to the gate of the driving transistor, in a writing period after the elapse of the compensating period; and supplies a driving current corresponding to the voltage across the storage capacitance to the light-emitting device by stopping applying a voltage to the gate of the driving transistor, in a driving period after the elapse of the writing period. According to the above light-emitting apparatus, the same advantages as those of the method according to the invention can be obtained.

According to a still another aspect of the invention, there is provided a light-emitting apparatus including: a pixel circuit;

and a driving circuit that drives the pixel circuit. The pixel circuit includes: a capacitance device having a first electrode and a second electrode; a P-channel driving transistor of which a gate is connected to the second electrode; a light-emitting device; a first switching device interposed between a signal line and the first electrode; a second switching device interposed between the gate of the driving transistor and a reset line to which a resetting voltage for resetting a gate voltage of the driving transistor is applied; and a third switching device interposed between the gate and drain of the driving transistor. The driving circuit allows the second switching device to be in an ON state in a resetting period, performs a compensating operation of setting a voltage applied to the signal line to a first reference voltage by allowing the second switching device to be in an OFF state and of asymptotically causing a gate-source voltage of the driving transistor to converge with a threshold voltage of the driving transistor by allowing the first switching device and the third switching device to be in an ON state, over a time duration variably set according to a gradation value of the pixel circuit, in a compensating period after the elapse of the resetting period; maintains the first switching device in the ON state and sets the voltage applied to the signal line to a gradation voltage corresponding to the gradation value, in a writing period after the elapse of the compensating period, and allows the first switching device to be in an OFF state, in a driving period after the elapse of the writing period. According to the above light-emitting apparatus, the same advantages as those of the method according to the invention can be obtained.

According to an aspect of the invention, the light-emitting apparatus may further comprise a fourth switching device that is disposed in a path of the driving current, and the driving circuit may supply the driving current to the light-emitting device by allowing the fourth switching device to be in an OFF state in the compensating period and the writing period and allowing the fourth switching device to be in an ON state in the driving period.

The above light-emitting apparatus may be used for various electronic apparatuses. As a typical example of the electronic apparatus, there is an apparatus where the light-emitting apparatus is used as a display. As the electronic apparatus according to the invention, a personal computer or a mobile phone is exemplified. The use of the light-emitting apparatus according to the invention is not limited to image display. For example, the light-emitting apparatus according to the invention may be adapted to an exposure apparatus (optical head) for forming a latent image on an image carrier such as a photosensitive drum by illuminating light beams.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
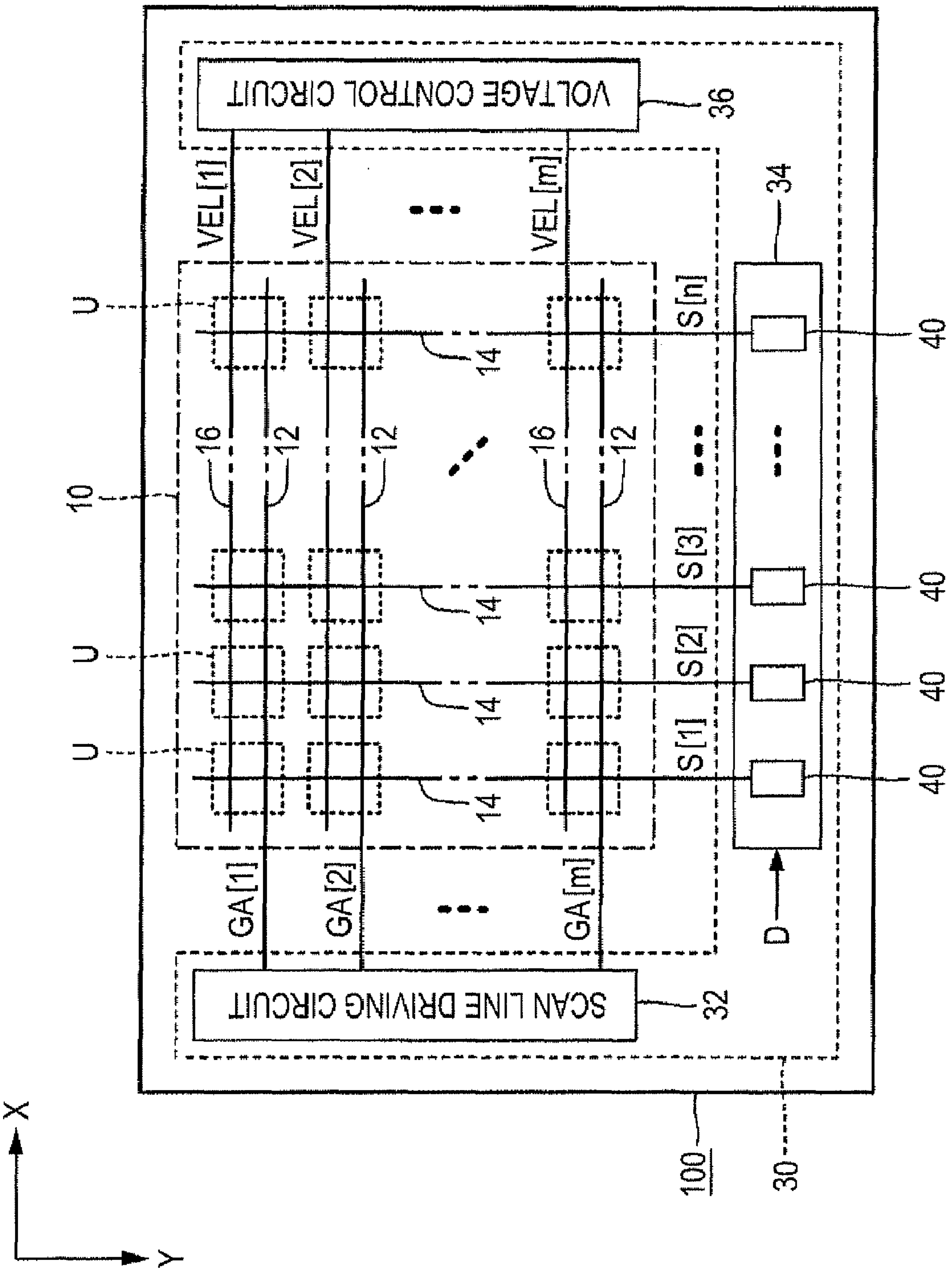
FIG. 1 is a block diagram showing a light-emitting apparatus according to a first embodiment of the invention.

Hereinafter, embodiments of the invention will be described with reference to the accompanying drawings. In the following description, elements denoted by the same reference numerals have the same function and operations if not stated otherwise.

A: First Embodiment

FIG. 1 is a block diagram showing a light-emitting apparatus according to the first embodiment of the invention. The light-emitting apparatus 100 is mounted on an electronic apparatus as a display body for displaying an image. As shown in FIG. 1, the light-emitting apparatus 100 includes a device unit 10 in which a plurality of pixel circuits U are arranged and a driving circuit 30 which drives the pixel circuits U. The driving circuit 30 includes a scan line driving circuit 32, a signal line driving circuit 34, and a voltage control circuit 36. The driving circuit 30 is mounted to be divided into, for example, a plurality of integrated circuits. However, at least a portion of the driving circuit 30 can include thin film transistors formed on a substrate.

In the device unit 10, m scan lines 12 extending in a X direction and n signal lines 14 extending in a Y direction orthogonal to the X direction are disposed (m and n are natural numbers). The plurality of pixel circuits U are disposed corresponding to intersections of the scan lines 12 and the signal lines 14, and are arranged in an array of m columns×n rows. In the device unit 10, m feed lines 16 extending in the X direction are disposed together with the scan line 12.

The scan line driving circuit 32 sequentially selects the pixel circuits U in units of row by outputting to the scan lines 12 the scan signals GA (GA[1]~GA[m]) that occur sequentially in an active level (high level) in a predetermined sequence. The voltage control circuit 36 generates voltages VEL (VEL[1]~VEL[m]) to output the voltages to the feed lines 16.

The signal line driving circuit 34 generates signals S (S[1]~S[n]) that define the operations of the pixel circuits U to output the signals to the signal lines 14. As shown in FIG. 1, the signal line driving circuit 34 includes n unit circuits 40 corresponding to the signal lines 14. The j-th (j=1~n) unit circuit 40 outputs the signal S[j] to the j-th signal line 14. For example, the unit circuit 40 sets the signal S[j] to a voltage (hereinafter, referred to as a "gradation voltage") VDATA corresponding to a gradation value D that is designated to the j-th pixel circuit U in the row selected by the scan line driving circuit 32.

Figure 2:
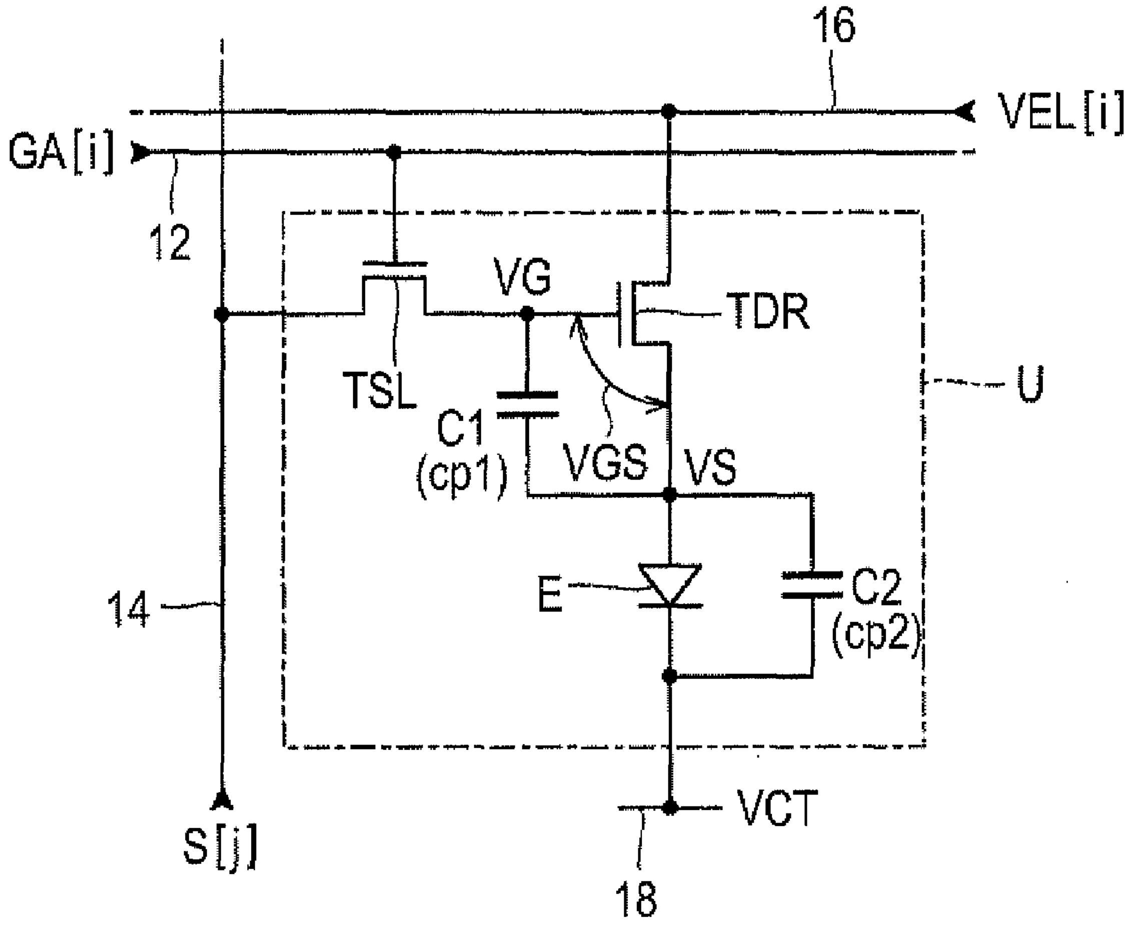
FIG. 2 is a circuit view showing a pixel circuit.

FIG. 2 is a circuit view of the pixel circuit U. In FIG. 2, only one of the j-th pixel circuit U in the i-th row (i=1 to m) is shown as a representation. As shown in FIG. 2, the pixel circuit U includes a light-emitting device E, a driving transistor TDR, a selecting switch TSL, and a storage capacitance C1. The light-emitting device E and the driving transistor TDR are serially connected in a path that connects the feed line 16 and the feed line 18. The feed line 18 (a ground line) is applied with a predetermined voltage VCT from a power supply circuit (not shown). The light-emitting device E is an organic EL (electroluminescence) device where a light-emitting layer made of an organic EL material is interposed between an anode and a cathode facing each other. As shown in FIG. 2, the light-emitting device E is accompanied with a capacitance C2 (capacitance value cp2).

The driving transistor TDR is an N-channel transistor (for example, a thin film transistor) of which drain is connected to the feed line 16 and of which the source is connected to the anode of the light-emitting device E. The storage capacitance C1 (capacitance value cp1) is interposed between the gate and source of the driving transistor TDR. The selecting switch TSL is interposed between the signal line 14 and the gate of the driving transistor TDR to control the electrical connection (electrical conduction/non-conduction) between the signal line and the gate of the driving transistor. The gate of the selecting switch TSL is connected to the scan line 12.

Figure 3:
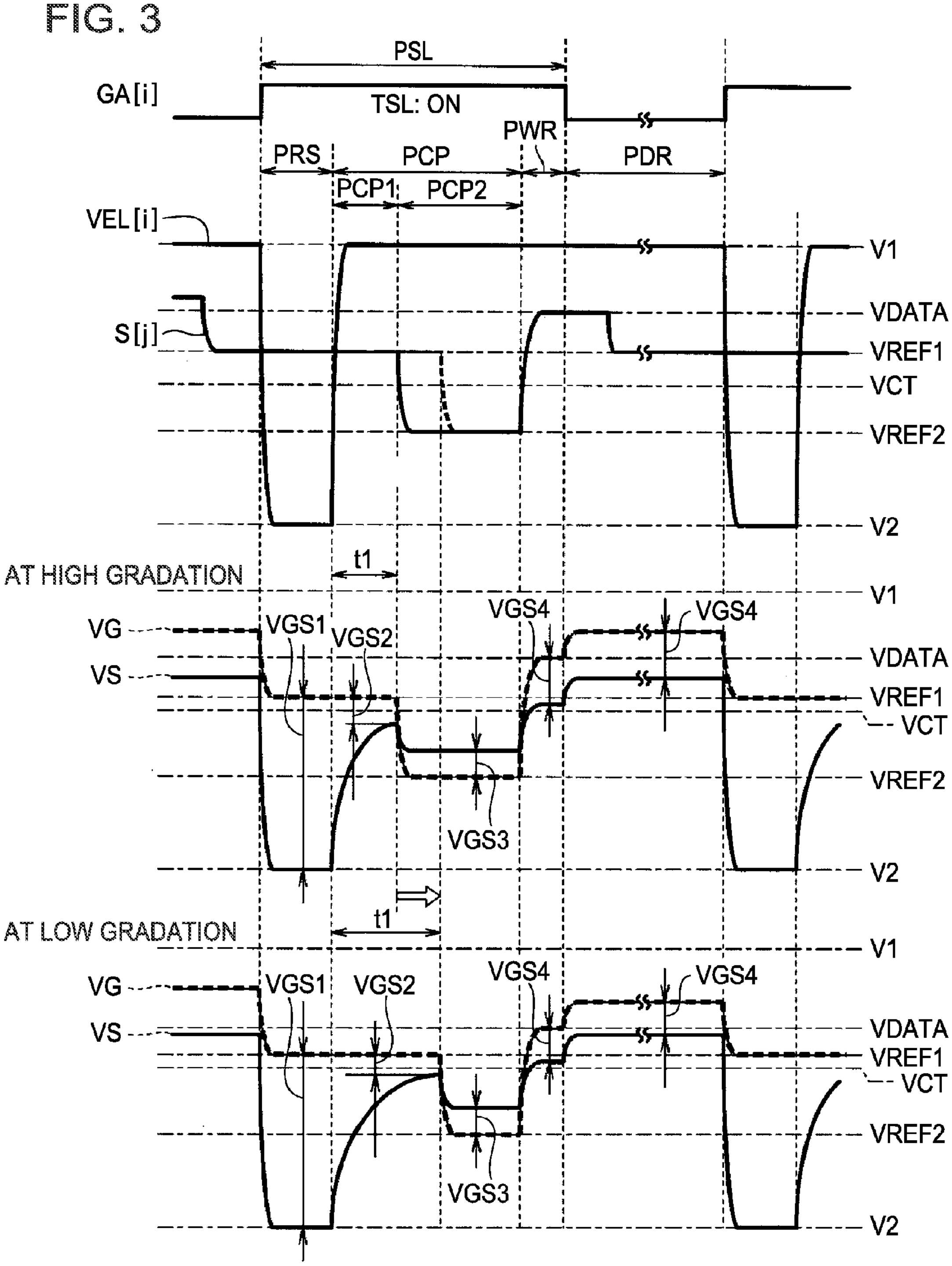
FIG. 3 is a timing chart showing operations of a light-emitting apparatus.

Next, operations of the driving circuit 30 (a method of driving the pixel circuit U) will be described with reference to FIG. 3, in which the description is concentrated on the j-th pixel circuit U in the i-th row. As shown in FIG. 3, the scan line driving circuit 32 sets the scan signal GA[i] to the active level in the i-th selecting period PSL in a vertical scan period. If the scan signal GA[i] is set to the active level, the selecting switches TSL of the n pixel circuits U in the i-th row are simultaneously changed to the ON state.

As shown in FIG. 3, the selecting period PSL includes a resetting period PRS, a compensating period PCP, and a writing period PWR. A gate-source voltage VGS (that is, a voltage across the storage capacitance C1) of the driving transistor TDR is reset to a predetermined voltage in the resetting period PRS. The voltage VGS is asymptotically caused to converge with a threshold voltage VTH of the driving transistor TDR in the compensating period PCP after the elapse of the resetting period PRS. In the writing period PWR after the elapse of the compensating period PCP, the voltage VGS of the driving transistor TDR is set to a voltage corresponding to a gradation value D designated to the pixel circuit U. In the driving period PDR after the elapse of the selecting period PSL, a driving current IDR corresponding to the voltage VGS of the driving transistor TDR is supplied from the feed line 16 through the driving transistor TDR to the light-emitting device E. The light-emitting device E emits light with a luminance corresponding to the driving current IDR. Next, the operations of the pixel circuit U in the resetting period PRS, the compensating period PCP, the writing period PWR, and the driving period PDR will be described in detail.

Figure 4:
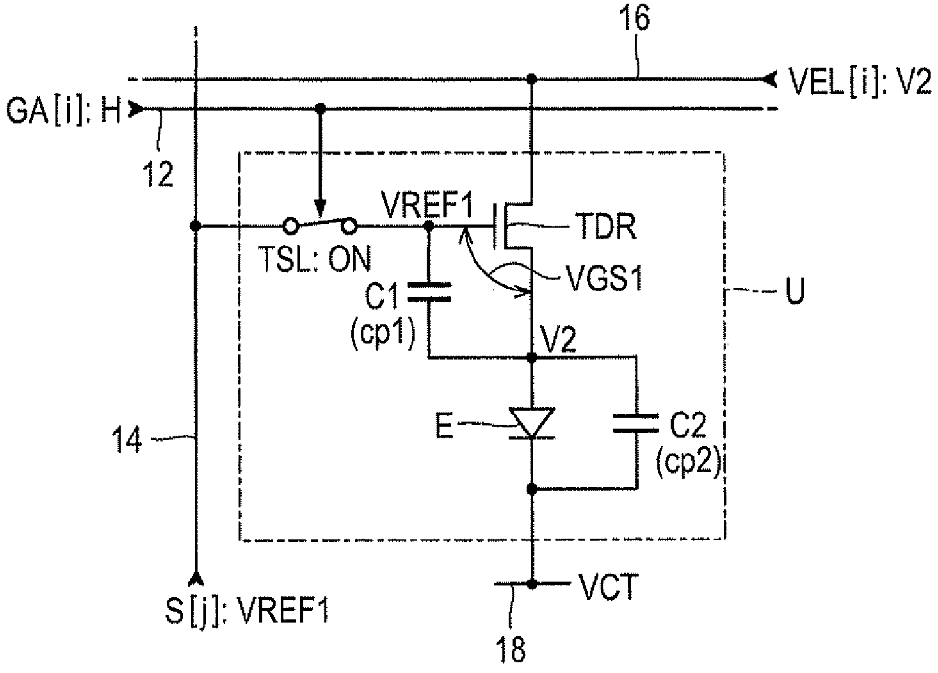
FIG. 4 is a circuit view showing a state of the pixel circuit in a resetting period.

[1] Resetting Period PRS (FIG. 4)

As shown in FIGS. 3 and 4, in the resetting period PES, the signal line driving circuit 34 sets the signal S[j] to a reference voltage VREF1, and the voltage control circuit 36 sets the voltage VEL[i] to a voltage V2. Since the selecting switch TSL is in the ON state, the gate voltage VG of the driving transistor TDR is set to the reference voltage VREF1 of the signal S[j] through the signal line 14 and the selecting switch TSL. In addition, the source voltage VS of the driving transistor TDR is set to the voltage V2. Therefore, the voltage VGS of the driving transistor TDR (that is, the voltage across the storage capacitance C1) is reset to a voltage difference VGS1 (VGS1=VREF1−V2) between the reference voltage VREF1 and the voltage V2.

The reference voltage VREF1 and the voltage V2 are set so that the voltage difference VGS1 is sufficiently higher than the threshold voltage VTH of the driving transistor TDR, as expressed in the following Equation (1), and the voltage (V2−VCT) across the light-emitting device E is sufficiently lower than the threshold voltage VTH_OLED of the light-emitting device E, as expressed in the following Equation (2). Therefore, in the resetting period PRS, the driving transistor TDR is in the ON state, and the light-emitting device F is in the OFF state (non-emitting state).

$$VGS1=VRFF1-V2>>VTH \quad (1)$$

$$V2-VCT<<VTH\_OLED \quad (2)$$

Figure 5:
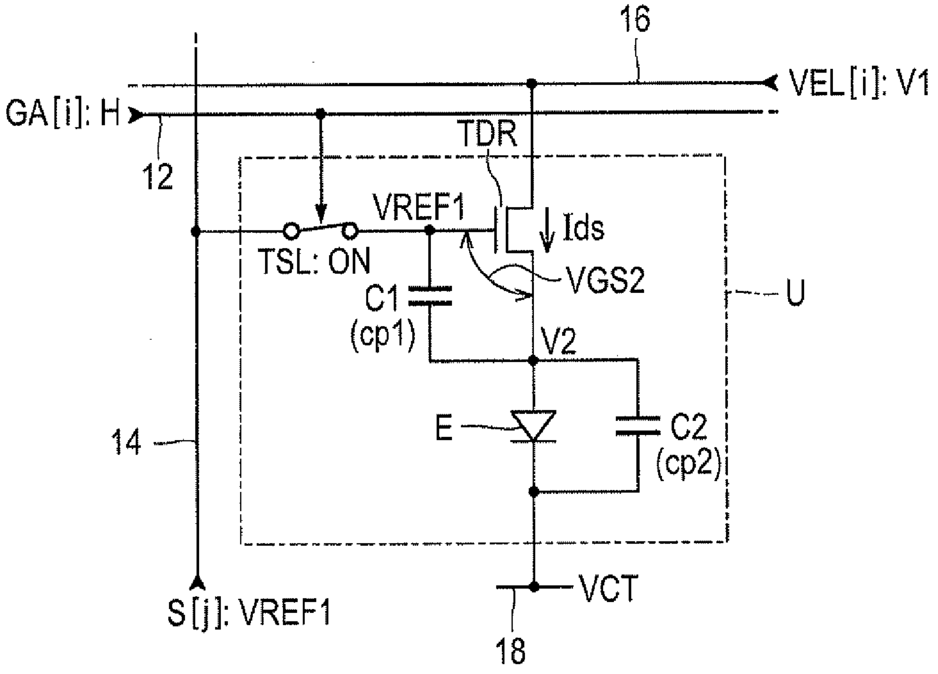
FIG. 5 is a circuit view showing a state of the pixel circuit in an operating period of a compensating period.
Figure 6:
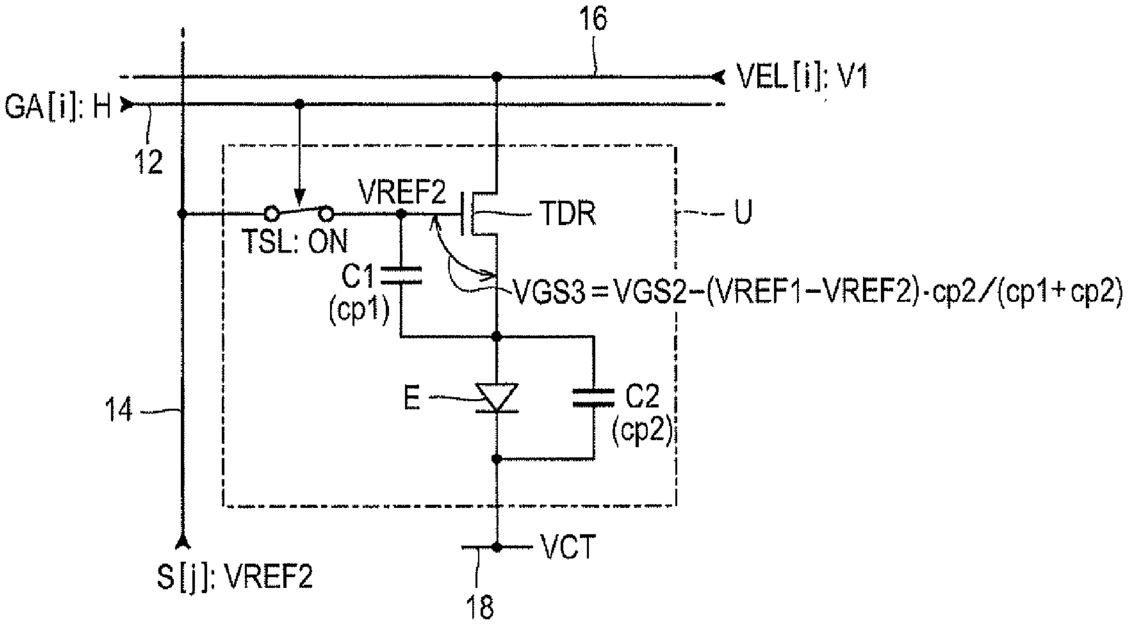
FIG. 6 is a circuit view showing a state of the pixel circuit in a sustaining period of a compensating period.

[2] Compensating Period PCP (FIGS. 5 and 6)

As shown in FIG. 3, the compensating period PCP is divided into an operating period PCP1 and a sustaining period PCP2. The operating period PCP1 is a period from the starting point of the compensating period PCP (that is, the ending point of the resetting period PRS) to the time point when the time duration t1 elapses from the starting point of the compensating period PCP. The sustaining period PCP2 is the remaining period of the compensating period PCP (that is, the period from the ending point of the operating period PCP1 to the ending point of the compensating period PCP). The time duration t1 of the operating period PCP1 is variably set according to the gradation value D designated to the pixel circuit U. As shown in FIG. 3, the time duration t1 of a case where the gradation value D indicates a high gradation (high luminance) is relatively shorter than the time duration t1 of a case where the gradation value D indicates a low gradation (low luminance). The setting of the time duration t1 of the operating period PCP1 will be described later.

As shown in FIGS. 3 and 5, if the operating period PCP1 starts, the voltage control circuit 36 changes the voltage VEL [i] of the feed line 16 (that is, the drain voltage of the driving transistor TDR) to the voltage V1. As shown in FIG. 3, the voltage V1 is sufficiently higher than the voltage V2 or the reference voltage VREF1. Similarly to the resetting period PRS, the signal line driving circuit 34 maintains the signal S[j] to the reference voltage VREF1. Since the selecting switch TSL is maintained in the ON state even in the compensating period PCP, the gate voltage VG of the driving transistor TDR is maintained at the reference voltage VREF1. Since the driving transistor TDR is transitioned into the ON state in the resetting period PRS, the current Ids expressed by the following Equation (3) flows between the drain and source of the driving transistor TDR under the above state, as shown in FIG. 5. In Equation (3), μ is the mobility of the driving transistor TDR. In addition, W/L is the relative ratio of the channel width W to the channel length L of the driving transistor TDR, and Cox is the capacitance per unit area of a gate insulating layer of the driving transistor TDR.

$$Ids=\tfrac{1}{2}\cdot\mu\cdot W/L\cdot Cox\cdot(VGS-VTH)^2 \quad (3)$$

Since the current Ids flows from the feed line 16 through the driving transistor TDR so as to charge the storage capacitance C1 and the capacitance C2 with electric charge, the source voltage VS of the driving transistor TDR is gradually increased, as shown in FIG. 3. Since the gate voltage VG of the driving transistor TDR is fixed to the reference voltage VREF1, the gatesource voltage VGS of the driving transistor TDR is decreased together with an increase in the source voltage VS. As understood from Equation (3), the current Ids is decreased by the same amount as the voltage VGS is decreased to approach the threshold voltage VTH. Therefore, in the operating period PCP1 of the compensating period PCP, the voltage VGS of the driving transistor TDR is decreased with the passing of time from the voltage VGS1 (VGS1=VREF1−V2) set in the resetting period PRS to be asymptotically converged to the threshold voltage VTH.

The operation of asymptotically causing the voltage VGS to converge with the threshold voltage VTH (hereinafter, referred to as a "compensating operation") is stopped at the starting point of the sustaining period PCP2 (that is, the time point when the time duration t1 elapses from the starting point of the compensating period PCP) before the voltage VGS approaches the threshold voltage VTH. The gate-source voltage VGS of the driving transistor TDR is set to the voltage VGS2 of the starting point of the sustaining period PCP2. Now, the stopping of the compensating operation will be described in detail.

As shown in FIGS. 3 and 6, if the sustaining period PCP2 starts, the signal line driving circuit 34 changes the signal S[j] to the reference voltage VREF2. The reference voltage VREF2 is lower than the reference voltage VREF1. Since the selecting switch TSL is continuously maintained in the ON state in this period as well as the operating period PCP1, the gate voltage VG of the driving transistor TDR is changed (decreased) from the reference voltage VREF1 of the operating period PCP0 to the reference voltage VREF2 at the same time as the sustaining period P202 starts.

Since the storage capacitance C1 is interposed between the gate and source of the driving transistor TDR, the source voltage VS of the driving transistor TDR is changed (decreased) in cooperation with the gate voltage VG, as shown in FIG. 3. The change of the voltage VS of the starting point of the sustaining period PCP2 corresponds to a voltage (ΔVREF·cp1/(cp1+cp2)) that is obtained by dividing the change ΔVREF (ΔVREF=VREF1−VREF2) of the voltage VG according to a capacitance ratio of the storage capacitance C1 and the capacitance C2. Therefore, the voltage VGS3 just after the start of the sustaining period PCP2 is expressed by the following Equation (4) by using the gate-source voltage VGS2 of the driving transistor TDR of the ending point of the operating period PCP1.

$$VGS3=VGS2-\Delta VREF\cdot cp2/(cp1+cp2) \quad (4)$$

The reference voltage VREF2 is set so that the voltage VGS3 of Equation (4) is lower than the threshold voltage VTH of the driving transistor TDR. Therefore, in the sustaining period PCP2, the driving transistor TDR is transitioned into the OFF state by changing the gate voltage VG of the driving transistor TDR to the reference voltage VREF2. Accordingly, the compensating operation of asymptotically causing the voltage VGS to converge with the threshold voltage VTH by causing the current Ids to flow to the driving transistor TDR is stopped at the same time as the sustaining period PCP2 starts, and the voltage VGS of the driving transistor TDR is maintained at the voltage VGS3 of Equation (4) until the ending point of the sustaining period PCP2.

Figure 7:
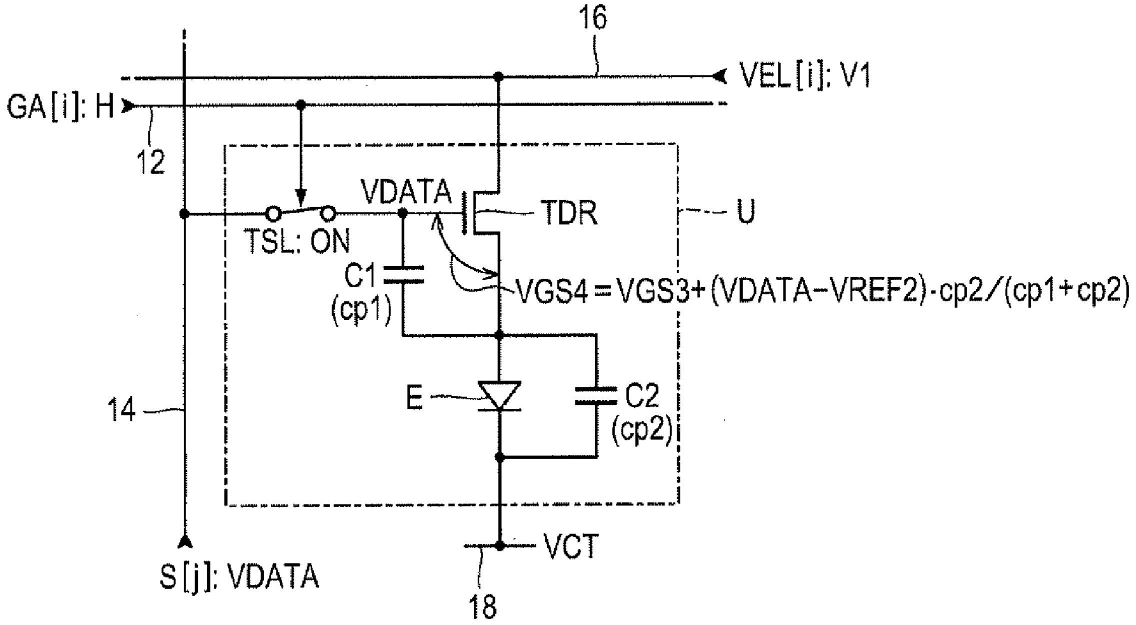
FIG. 7 is a circuit view showing a state of the pixel circuit in a writing period.

[3] Writing Period PWR (FIG. 7)

AS shown in FIGS. 3 and 7, if the writing period PWR starts, the signal line driving circuit 34 changes the signal S[j] to the gradation voltage VDATA. The gradation voltage VDATA is variably set according to the gradation value designated to the pixel circuit U (that is, the light-emitting device E). Since the selecting switch TSL is maintained in the ON state even in the writing period PWR, the gate voltage VG of the driving transistor TDR is changed from the reference voltage VREF2 set in the sustaining period PCP2 to the gradation voltage VDATA. In addition, the source voltage VS of the driving transistor TDR is changed in cooperation with the voltage VG. The change of the voltage VS just after the start of the writing period PWR corresponds to a voltage (ΔV·cp1/(cp1+cp2)) that is obtained by dividing the change ΔV (ΔV=VDATA-VREF2) of the VG according to a capacitance ratio of the storage capacitance C1 and the capacitance C2.

Therefore, the gate-source voltage VGS4 of the driving transistor TDR (that is, the voltage across the storage capacitance C1) just after the writing period PWR is expressed by the following Equation (5). In this manner, the voltage VGS4 is set according to the gradation voltage VDATA (more specifically, the voltage difference between the gradation voltage VDATA and the reference voltage VREF1), so that the driving transistor TDR is changed into the ON state.

$$\begin{aligned} VGS4 &= VGS3 + \Delta V \cdot cp2/(cp1+cp2) \quad (5) \\ &= \{VGS2 - \Delta VREF \cdot cp2/(cp1+cp2)\} + \\ &\quad \Delta V \cdot cp2/(cp1+cp2) \\ &= VGS2 + \{-(VREF1 - VREF2) + (VDATA - VREF2)\} \cdot \\ &\quad cp2/(cp1+cp2) \\ &= VGS2 + (VDATA - VREF1) \cdot cp2/(cp1+cp2) \end{aligned}$$

Figure 8:
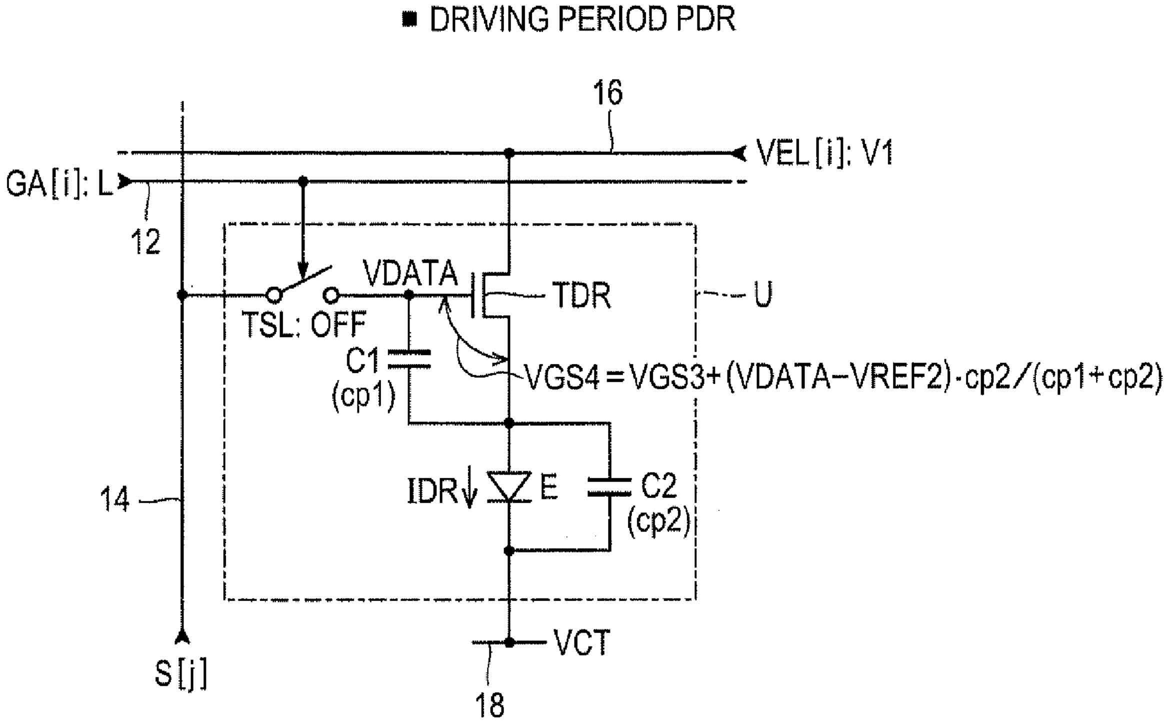
FIG. 8 is a circuit view showing a state of the pixel circuit in a driving period.

[4] Driving Period PDR (FIG. 8)

As shown in FIGS. 3 and 8, if the driving period PDR starts, the scan line driving circuit 32 changes the scan signal GA[i] to the inactive level (low level). Therefore, the selecting switches TSL of the pixel circuits U in the i-th row are changed into the OFF state. Accordingly, the gate of the driving transistor TDR is in an electrically floating state (that is, the application of the voltage to the gate of the driving transistor TDR is stopped). On the other hand, the current Ids of Equation (3) flows between the drain and source of the driving transistor TDR that is transitioned into the ON state in the writing period PWR, so that the capacitance C2 is charged. Therefore, in the state that the voltage VGS of the driving transistor TDR is maintained at the voltage VGS4 of Equation (5), the voltage across the capacitance C2 (that is, the source voltage VS of the driving transistor TDR) is gradually increased. In addition, at the time that the voltage across the capacitance C2 approaches the threshold voltage VTH_OLED of the light-emitting device E, the current Ids is supplied as the driving current IDR to the light-emitting device E. Accordingly, the driving current IDR is expressed by the following Equation (6).

$$IDR = \tfrac{1}{2} \cdot \mu \cdot W/L \cdot Cox \cdot (VGS4 - VTH)^2 \quad (6)$$

In this manner, since the driving current IDR is controlled to a current amount according to the voltage VGS4 corresponding to the gradation voltage VDATA, the light-emitting device E emits light with a luminance corresponding to the gradation voltage VDATA (that is, the gradation value D). The light emitting of the light-emitting device E is maintained until the starting point of the selecting period PSL where the scan signal GA[i] reaches the active level. Until now, the operations of the pixel circuit U are described.

Figure 9:
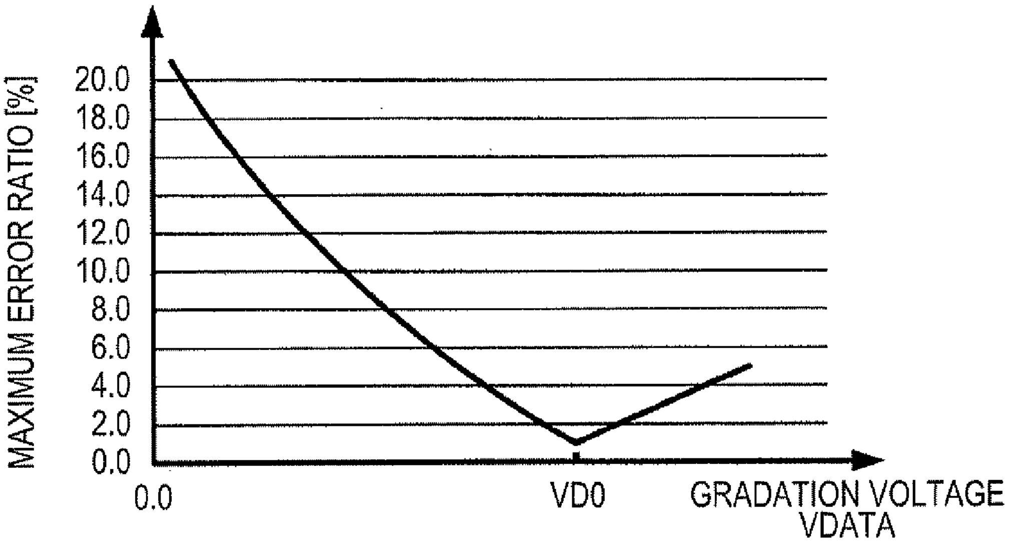
FIG. 9 is a graph showing a relationship between a gradation voltage and errors in a driving current in a comparative example.

Next, FIG. 9 is a graph showing a relationship between the gradation voltage VDATA and errors in the amount of the driving current IDR in a construction (hereinafter, referred to as a "comparative example") where the time duration t1 when the compensating operation is continuously performed is fixed to a predetermined value. In FIG. 9, the horizontal axis denotes a voltage value of a gradation voltage VDATA of which a reference value (0.0) is the reference voltage VREF1, and the vertical axis denotes a relative ratio (maximum error ratio) of maximum and minimum values with respect to the amount of the driving current IDR in a case where the same gradation value D is designated. In the comparative example, the time duration t1 is set to a sufficient time duration so that the voltage VGS of the driving transistor TDR approaches the threshold voltage VTH.

As can be understood from FIG. 9, in a case where the time duration t1 of the compensating operation is set to a fixed value, when the gradation voltage VDATA is set to a predetermined value VD0, errors in the driving current IDR can be reliably decreased. However, when the gradation voltage VDATA is separated from the predetermined value VD0, errors in the driving current IDR increase in proportion to the separation. The comparative example has a problem in that it is difficult to remove errors in the driving current IDR over a wide range of the gradation voltage VDATA.

Figure 10:
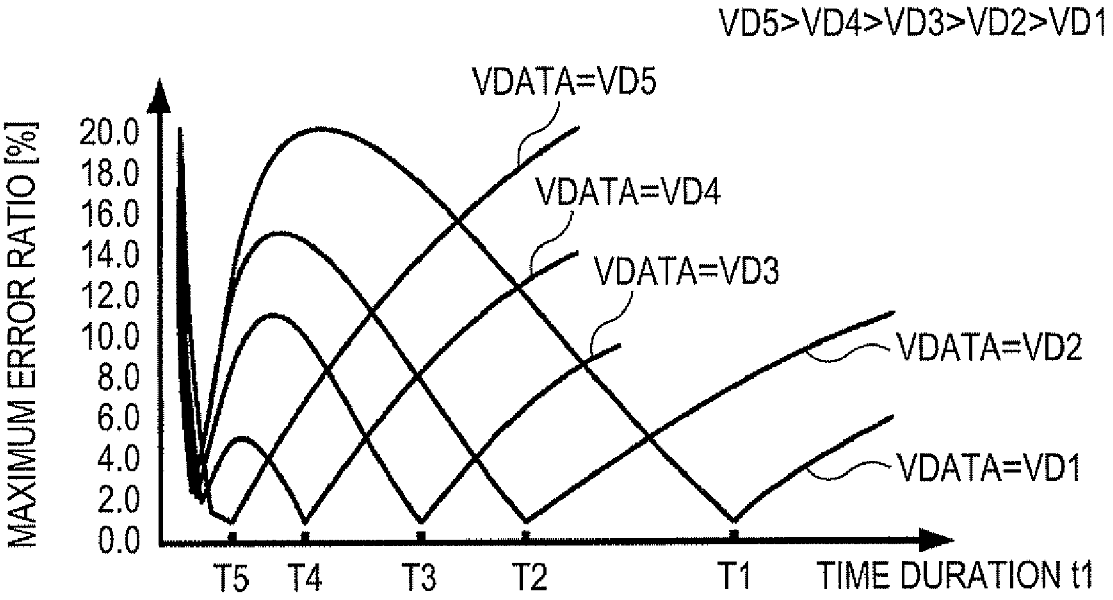
FIG. 10 is a graph showing a relationship between the time duration of an operating period and errors in the driving current.

FIG. 10 is a graph showing relationships between the time duration t1 of the operating period PCP1 and errors (maximum error ratio) in the driving current IDR with respect to a plurality of varied gradation voltages VDATA (VD1<VD2<VD3<VD4<VD5) in the embodiment. The tendency of the time duration t1, in which errors in the driving current IDR are minimized, to differ according to the gradation voltage VDATA can be seen from FIG. 10. In other words, the time duration t1, in which errors in the driving current IDR are minimized, is decreased in an inverse proportion to an increase in the gradation voltage VDATA.

Figure 11:
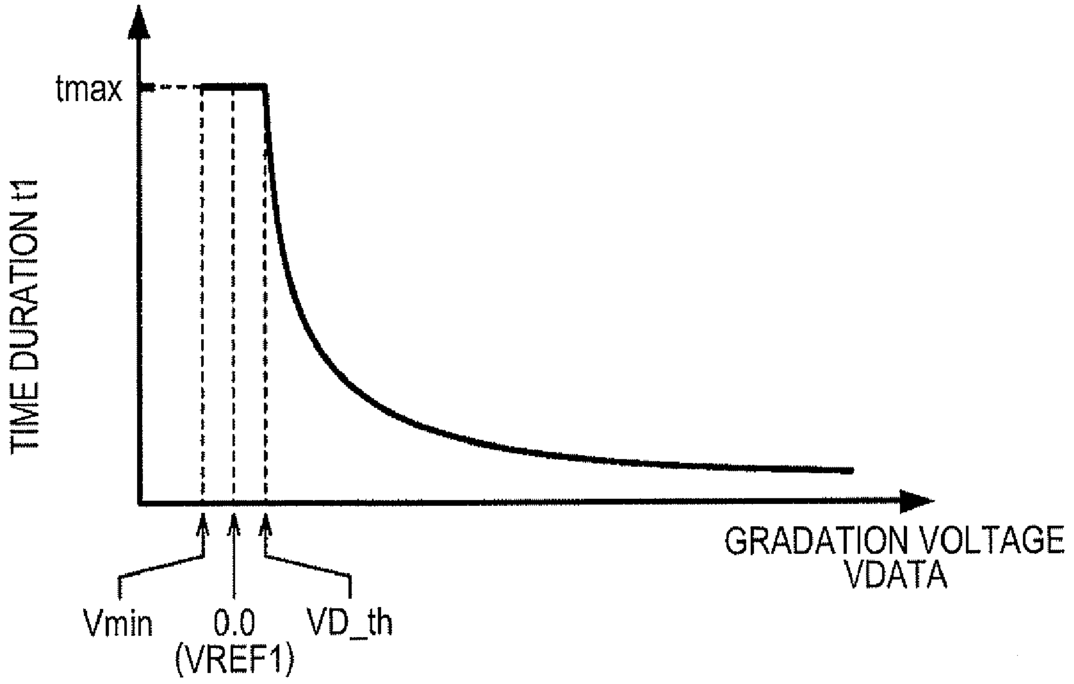
FIG. 11 is a graph showing a relationship between the gradation voltage and the time duration of the operating period.

In this manner, in the embodiment, the time duration t1 of the operating period PCPL is variably set according to the gradation value D (gradation voltage VDATA), so that errors in the driving current IDR can be suppressed irrespective of the gradation voltage VDATA. FIG. 11 is a graph showing a relationship between the gradation voltage VDATA and the time duration t1 of the operating period PCP1. As shown in FIG. 11, the time duration t1 is set according to the gradation voltage VDATA so that the time duration t1 of the operating period PCP1 is decreased by an increase of the gradation voltage VDATA (that is, an increase in the change of the gate voltage VG of the driving transistor TDR just after the start of the writing period PWR). For example, in the writing period PWR, in a case where the gradation voltage VDATA is set to the voltage VD1 of FIG. 10, the operating period PCP1 is set to a time duration T1, and in a case where the gradation voltage VDATA is set to the voltage VD2 that is higher than the voltage VD1, the operating period PCP1 is set to a time duration T2 that is shorter than the time duration T1.

However, the Lower the gradation voltage VDATA is, the longer the time duration t1 for minimizing the errors in the driving current IDR. Therefore, even in a case where the gradation voltage VDATA is sufficiently low (for example, a case where the minimum gradation is designated), there is a need for setting the time duration t1 to an excessively long time in order to completely minimize errors in the driving current IDR. In the embodiment, as shown in FIG. 11, in a case where a gradation value D lower than a predetermined value is designated (a case where the gradation voltage VDATA is lower than the voltage VD_th of FIG. 11), the signal line driving circuit 34 (time adjuster 46 of the unit circuit 40) sets (clips) the time duration t1 of the operating period PCP1 to a predetermined value tmax that does not depend on the gradation value D. The maximum value tmax is limited to a time that is shorter than the time duration needed for decreasing the voltage VGS of the driving transistor TDR down to the threshold voltage VTH by the compensating operation. According to the above construction, it is possible to shorten the compensating period PCP (and the selecting period PSL).

As described with reference to FIG. 3, the compensating operation in the operating period PCP1 is ended by changing the signal S[j] (that is, the gate voltage VG of the driving transistor TDR) from the reference voltage VREF1 to the reference voltage VREF2. Each of the unit circuits 40 of the signal line driving circuit 34 variably controls the time duration t1 of the operating period PCP1 by adjusting the time of changing the signal S[j] from the reference voltage VREF1 to the reference voltage VREF2, according to the gradation value D.

Figure 12:
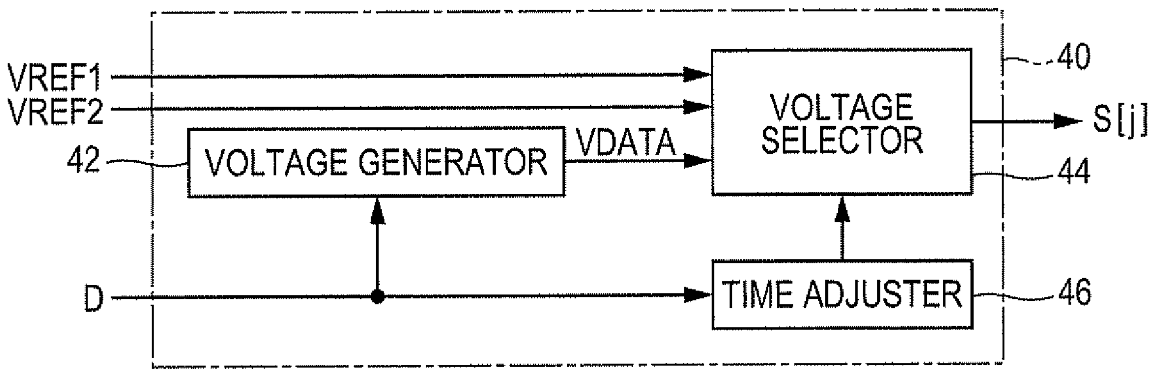
FIG. 12 is a block diagram showing a unit circuit in a signal line driving circuit.

FIG. 12 is a block diagram showing the unit circuit 40 of the signal line driving circuit 34. In FIG. 12, one unit circuit 40 that generates and outputs the signal S[j] is shown as a representation. As shown in FIG. 12, the unit circuit 40 includes a voltage generator 42, a voltage selector 44, and a time adjuster 46. The gradation value D of the j-th pixel circuit U is applied to the voltage generator 42 and the time adjuster 46.

The voltage generator 42 generates the gradation voltage VDATA corresponding to the gradation value D. For example, a voltage-output D/A converter is used for the voltage generator 42. The reference voltage VREF1 and the reference voltage VREF2 that are generated by a power supply circuit (not shown) and the gradation voltage VDATA that is generated by the voltage generator 42 are applied to the voltage selector 44. The voltage selector 44 selectively outputs one of the reference voltage VREF1, the reference voltage VREF2, and the gradation voltage VDATA as the signal S[j] to the signal line 14. More specifically, the voltage selector 44 outputs the reference voltage VREF1 in the resetting period PRS and the operating period PCP1 of the compensating period PCP, the reference voltage VREF2 in the sustaining period PCP2 of the compensating period PCP, and the gradation voltage VDATA in the writing period PWR.

The time adjuster 46 variably controls the time in which the voltage selector 44 changes the voltage of the signal S[j] from the reference voltage VREF1 to the reference voltage VREF2 (that is, the boundary between the operating period PCP1 and the sustaining period PCP2 of the compensating period PCP) according to the gradation value D. For example, a counter that starts counting at the starting point of the compensating period PCP and outputs a voltage transition (VREF1→VREF2) command to the voltage selector 44 at the time point at which the count value approaches a value corresponding to the gradation value D (that is, at the time point after the elapse of the time duration t1 from the starting point of the counting) is used for the time adjuster 46. As described above, the time adjuster 46 sets the maximum value tmax as the upper limit of the time duration t1.

The time duration t1 of the operating period PCP1 is controlled according to the gradation value D (that is, the gradation voltage VDATA) in the above-described construction. Since the time duration t1 is set to be shorter than the time needed for decreasing the voltage VGS of the driving transistor TDR from the voltage VGS1 of the ending point of the resetting period PRS to the threshold voltage VTH, the gate-source voltage VGS2 of the driving transistor TDR of the ending point of the operating period PCP1 is changed according to the time duration t1, but it does not approach the threshold voltage VTH. Therefore, the operation of controlling the time duration t1 of the operating period PCP1 according to the gradation value D can be understood as an operation of variably controlling the voltage VGS2 of the ending point of the operating period PCP1 according to the gradation value D. In addition, the total time duration of the compensating period PCP is fixed. Therefore, the sustaining period PCP2 is decreased in an inverse proportion to an increase of the operating period PCP1 that is increased.

In addition, the main causes of errors in the driving current IDR are errors in the threshold voltage VTH and mobility μ of the driving transistor TDR. In order to compensate only for the errors in the threshold voltage VTH, as disclosed in Patent Document 1, there is a need to match the voltage VGS of the driving transistor TDR with the threshold voltage VTH in the compensating period PCP. In the embodiment, although the voltage VGS of the driving transistor TDR in the compensating period PCP does not approach the threshold voltage VTH, errors in the driving current IDR can be reliably suppressed by adjusting the time duration t1, as shown in FIG. 10. Since errors in the mobility μ as well as errors in the threshold voltage VTH are compensated by adjusting the time duration t1, errors in the driving current IDR can be suppressed irrespective of the fact that the voltage VGS in the compensating period PCP does not approach the threshold voltage VTH. Accordingly, in the embodiment, the time duration t1 is variably controlled so that both the threshold voltage VTH and the mobility μ of the driving transistor TDR are compensated.

Figure 13:
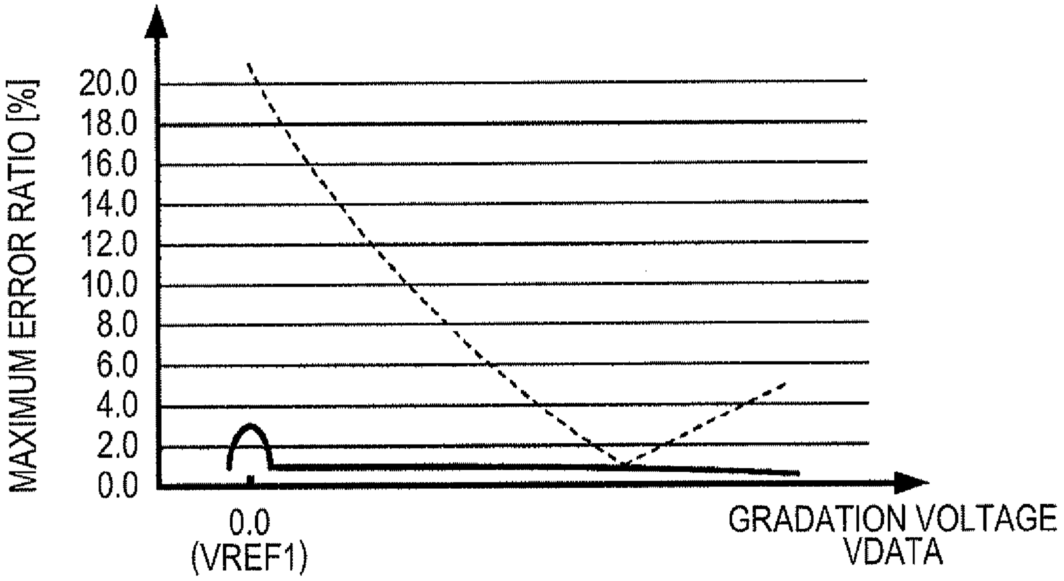
FIG. 13 is a graph for explaining an effect of the first embodiment.

FIG. 13 is a graph showing a relationship between the gradation voltage VDATA and errors in the driving current IDR in the embodiment, which is plotted with a solid line. In FIG. 13, the relationship (FIG. 9) between the gradation voltage VDATA and errors in the driving current IDR in the comparative example is also plotted with a dashed line. As shown in FIG. 13, according to the embodiment, in comparison with the construction of Patent Document 1 where the time duration of the compensating operation is fixed, there is an advantage in that errors in the driving current IDR can be suppressed over a wide range of the gradation voltage VDATA.

In addition, a slight increase in errors in the driving current IDR in a low gradation region of the gradation voltage VDATA in FIG. 13 is considered to be caused from the influence of a limitation of the upper limit of the time duration t1 to the maximum value tmax. If errors in the driving current IDR occurs in the low gradation, in a case where the gradation value D indicates, for example, the lowest gradation (that is, black display), an amount of the driving current IDR needs to be set to zero. However, the driving current IDR may be supplied to the light-emitting device E (and thus, the light-emitting device E emits light). For this reason, in the embodiment, in a case where the gradation value indicates the lowest gradation, the gradation voltage VDATA is set to the voltage Vmin (refer to FIG. 11) that is lower than the reference voltage VREF1. According to the above construction, in a case where the gradation value indicates the lowest gradation, since the voltage VGS of the driving transistor TDR is surely lower than the threshold voltage VTH, there is an advantage in that the amount of the driving current IDR in case of the gradation value indicating the lowest gradation can be reliably set to zero, irrespective of the construction that the time duration t1 of the operating period PCP1 is limited to the maximum value tmax.

B: Second Embodiment

Now, a second embodiment of the invention will be described. If the gate-source voltage VGS of the driving transistor TDR is set to the voltage VGS4 of Equation (5) at the same time as the writing period PWR starts, the current Ids of Equation (3) flows between the drain and source of the driving transistor TDR. The source voltage VS of the driving transistor TDR (that is, the voltage across the capacitance C2) is increased at the same time as the storage capacitance C1 and the capacitance C2 are charged by the current Ids. In the first embodiment, the writing period PWR is designed to be so short that the increase in the voltage VS due to the charging in the writing period PWR is negligible. However, in the embodiment, the increase in the voltage VS in the writing period PWR is considered.

Figure 14:
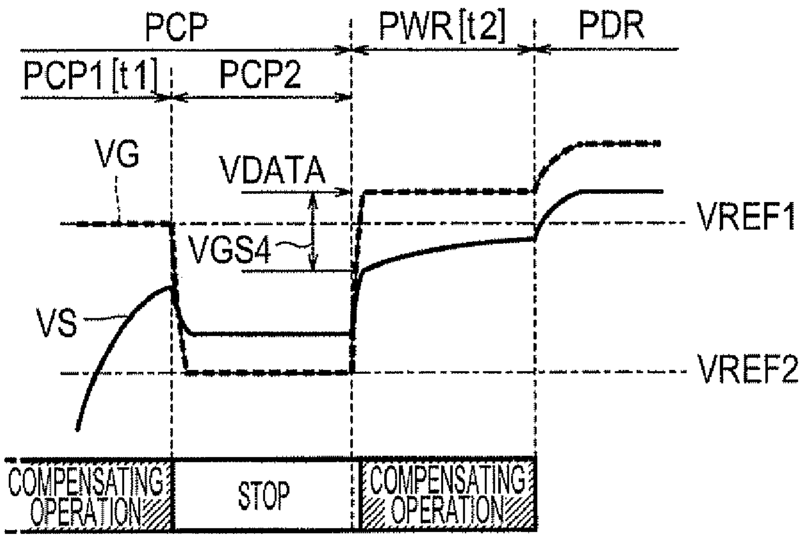
FIG. 14 is a timing chart showing operations of a light-emitting apparatus according to a second embodiment of the invention.

As shown in FIG. 14, if the voltage VGS of the driving transistor TDR just after the start of the writing period PWR is set to the voltage VGS4 of Equation (5), the source voltage VS of the driving transistor TDR is gradually increased at the same time as the changing is performed by the current Ids. Since the gate voltage VG of the driving transistor TDR is maintained at the gradation voltage VDATA, the gate-source voltage VGS of the driving transistor TDR is decreased as the same time as the source voltage VS is increased. Therefore, as shown in FIG. 14, the compensating operation of asymptotically causing the voltage VGS to converge with the threshold voltage VTH is also performed in the writing period PWR as well as the operating period PCP1.

In the embodiment, by taking into consideration the compensating operations in the operating period PCP1 and the writing period PWR, the time duration t1 corresponding to the gradation voltage VDATA is determined based on a sum T of the time duration t1 of the operating period PCP1 and the time duration t2 of the writing period PWR. More specifically, with respect to a plurality of the gradation voltages VDATA, a sum T for minimizing errors in the driving current IDR is specified by an experiment or calculation (simulation), and a difference between the sum T and the time duration t2 (a fixed value) is determined as the time duration t1 of the operating period PCP1.

Figure 15:
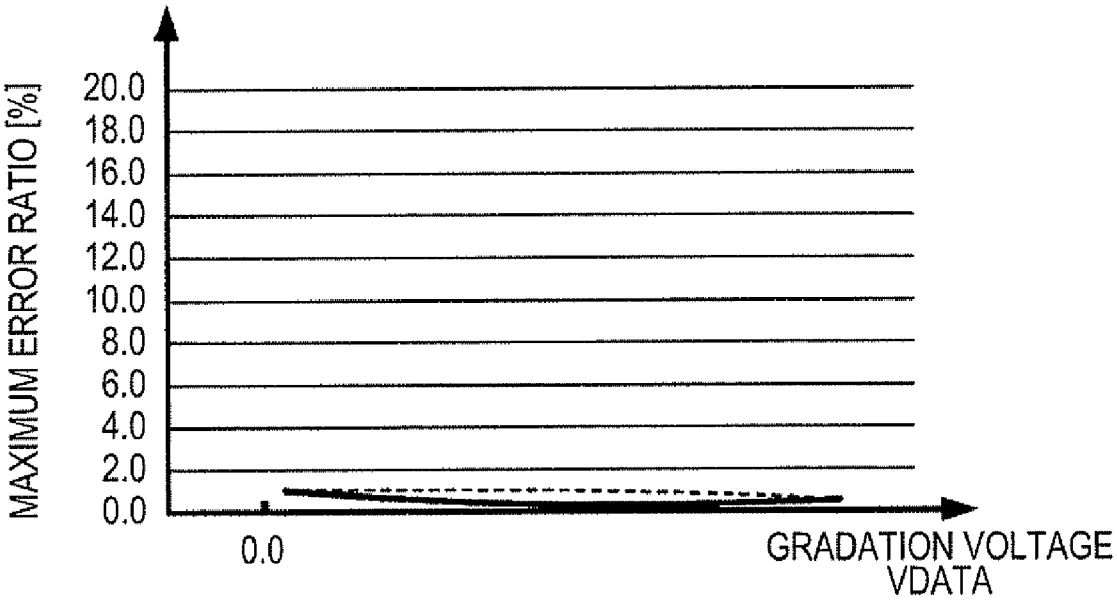
FIG. 15 is a graph for explaining an effect of the second embodiment.

FIG. 15 is a graph showing a relationship between the gradation voltage VDATA and errors in the driving current IDE in the embodiment. In FIG. 15, the relationship (FIG. 13) between the gradation voltage VDATA and errors in the driving current IDR in the first embodiment is also plotted with a dashed line. In the embodiment, since the time duration t1 of the operating period PCP1 is set by additionally considering the change of the voltage VGS due to the compensating operation in the writing period PWR, errors in the driving current IDR can be reduced as shown in FIG. 15, in comparison with the first embodiment where the compensating operation in the writing period PWR is not considered.

C: Third Embodiment

Figure 16:
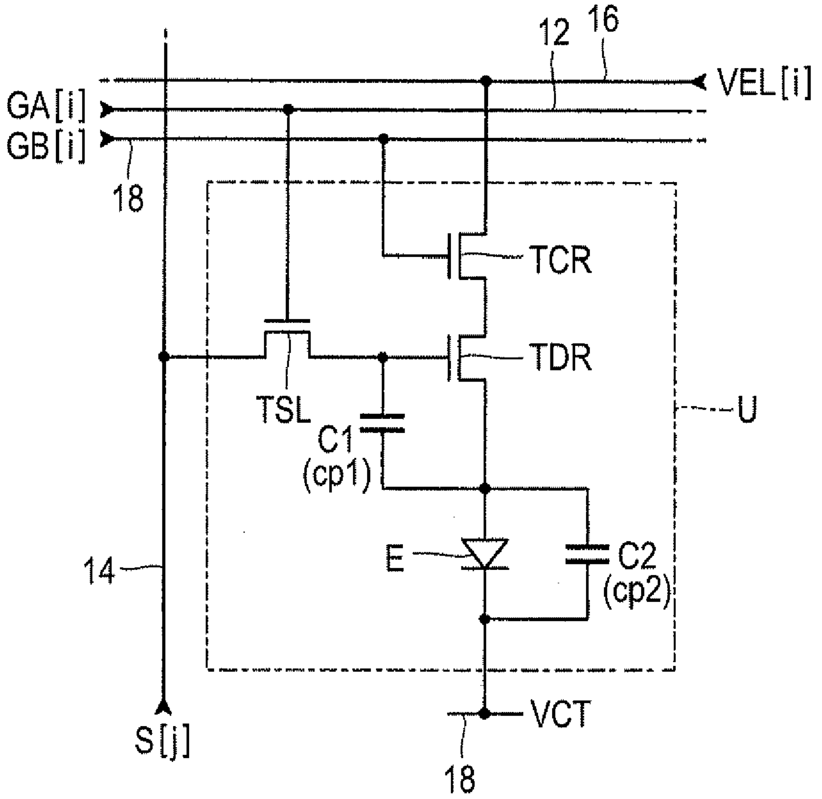
FIG. 16 is a circuit view showing a pixel circuit according to a third embodiment of the invention.

FIG. 16 is a circuit view showing a pixel circuit U according to a third embodiment of the invention. As shown in FIG. 16, the pixel circuit U according the embodiment includes a control switch TCR as well as the construction of the pixel circuit U according to the first embodiment. The control switch TCR is disposed in a path of the drain-source current Ids (that is, the driving current IDR) of the driving transistor TDR. For example, as shown in FIG. 16, an N-channel transistor interposed between the drain of the driving transistor TDR and the feed line 16 is used as a control switch TCR. If the control switch TCR is transitioned into the ON state, the path of the current Ids is set up. If the control switch TCR is transitioned into the OFF state, the path of the current Ids is blocked.

In the device unit 10, m control lines 52 extending in the X direction are disposed together with the scan line 12. As shown in FIG. 16, the gate of the control switch TCR of each of the pixel circuits U in the i-th row is connected to the control line 52 in the i-th row. Control signals GB (GB[1]~GB[m]) are applied from the driving circuit 30 (for example, the scan line driving circuit 32) to the control lines 52.

Figure 17:
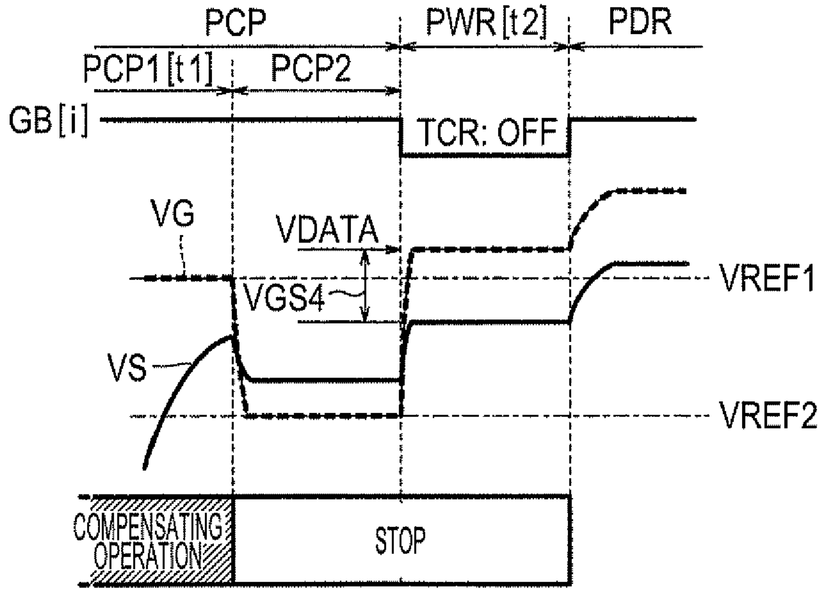
FIG. 17 is a timing chart showing operations of a light-emitting apparatus according to the third embodiment.

FIG. 17 is a timing chart for explaining the operations of the j-th pixel circuit U in the i-th row. As shown in FIG. 17, the control signal GB[i] is set to the inactive level (low level) in the writing period PWR in the i-th row selecting period PSL and to the active level (high level) in the periods (the resetting period PRS, the compensating period PCP, and the driving period PDR) other than the writing period PWFR. Therefore, the current Ids is set up by maintaining the control switch TCR to the ON state in the resetting period PRS, the compensating period PCP, and the driving period PDR. The current Ids is blocked by setting the control switch TCR to the OFF state in the writing period PWR.

In this manner, since the current Ids is blocked (that is, the storage capacitance C1 or the capacitance C2 is not charged) in the writing period PWR, after the gate-source voltage VGS of the driving transistor TDR just after the start of the writing period PWR is set to the voltage VGS4 of Equation (5), the source voltage VS of the driving transistor TDR is not changed. Accordingly, in the writing period PWR, the compensating operation is completely stopped.

In the above embodiment, the time for performing the compensating operation is limited to the operating period PCP1 of the compensating period PCP. Therefore, by setting only the time duration t1 of the operating period PCP1 according to the gradation voltage VDATA so that errors in the driving current IDR is reduced (ideally, minimized), errors in the driving current IDR can be reduced at a high accuracy similarly to FIG. 13, irrespective of the time duration of the writing period PWR (even in a case where the voltage VS in the writing period PWR is not negligible but long, for example, in the construction of the first embodiment).

D: Fourth Embodiment

Figure 18:
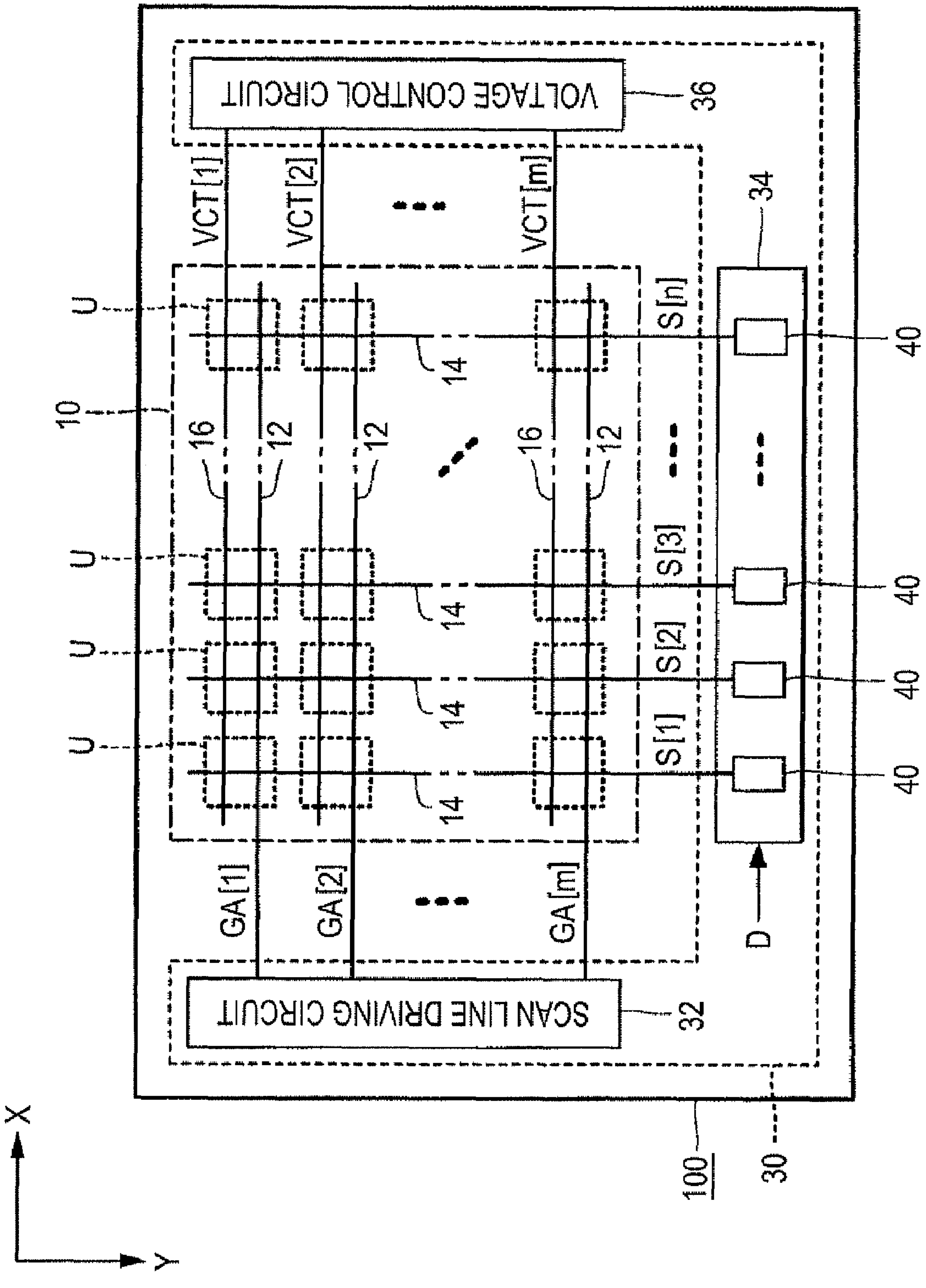
FIG. 18 is a block diagram showing a light-emitting apparatus according to a fourth embodiment of the invention.

FIG. 18 is a block diagram showing a light-emitting apparatus according to a fourth embodiment of the invention. The embodiment is different from the above embodiment in that the voltage control circuit 36 generates the voltage VCT (VCT[1]~VCT[m]) and outputs the voltage to each feed line 16.

Figure 19:
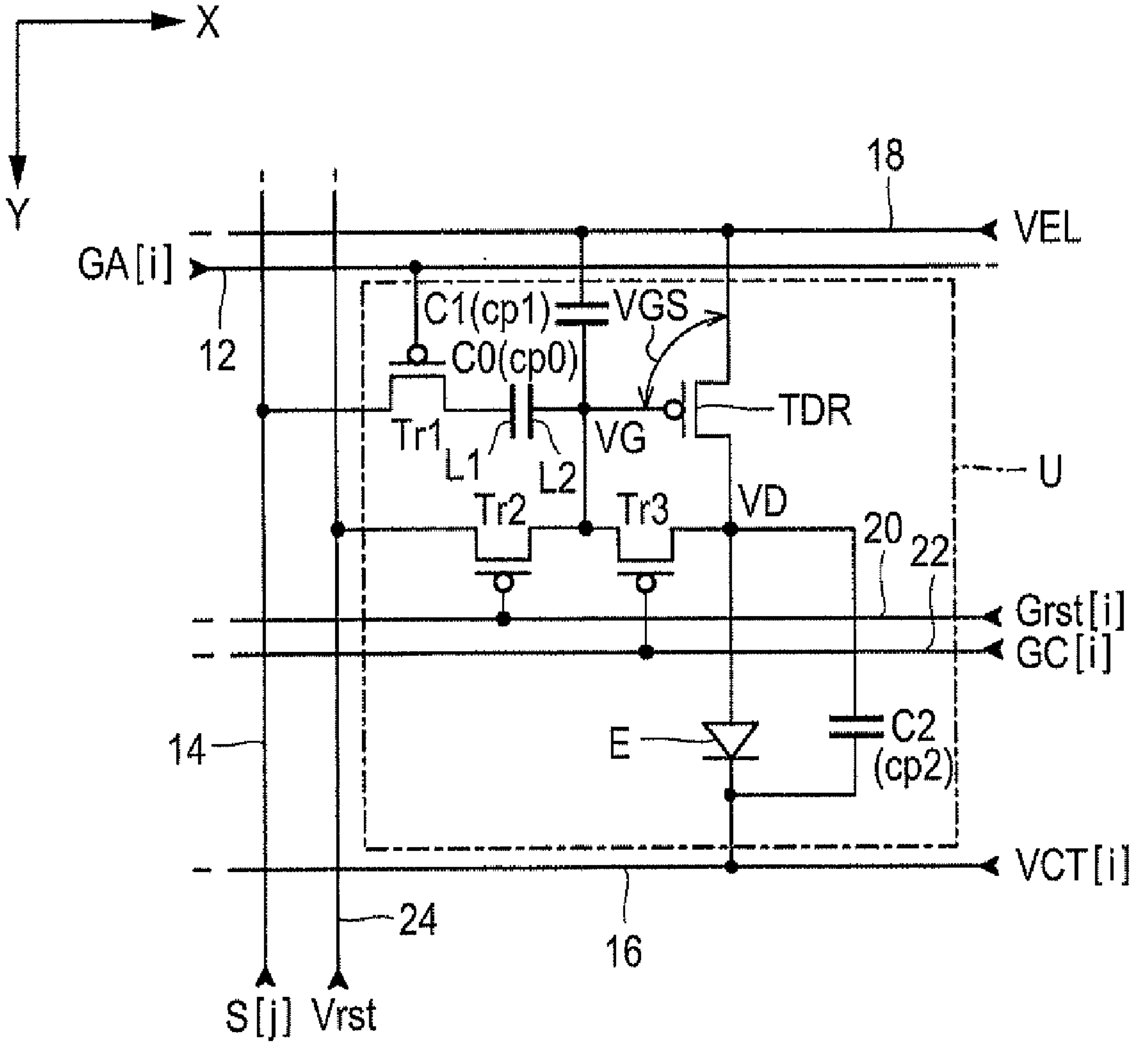
FIG. 19 is a circuit view showing a pixel circuit according to the fourth embodiment.

FIG. 19 is a circuit view showing a pixel circuits U according to the embodiment. In FIG. 19, one pixel circuit U of the j-th column in the i-th row (i=1~m) is shown as a representation. As shown in FIG. 19, in the device unit 10, the first and second control lines 20 and 22 extending in the X direction are disposed in one-to-one correspondence with the m scan lines 12. A predetermined signal is applied from the driving circuit 30 (for example, the scan line driving circuit 32) to each of the first and second control lines 20 and 22. More specifically, the resetting signal Grst[i] is applied to the first control line 20, and the control signal GC[i] is applied to the second control line 22. In addition, as shown in FIG. 19, in the device unit 10, the reset lines 24 extending in the Y direction are disposed in correspondence with the signal lines 14. The resetting voltage Vrst is applied from a power supply circuit (not shown) to the reset line 24.

As shown in FIG. 19, the pixel circuit U includes a light-emitting device E, a driving transistor TDR, a first switching device Tr1, a second switching device Tr2, a third switching device Tr3, a capacitance device C0 (capacitance value cp0), and a storage capacitance C1 (capacitance value cp1). The light-emitting device E and the driving transistor TDR are serially connected in a path that connects the feed line 18 and the feed line 16. The feed line 18 is applied with a predetermined voltage VEL from a power supply circuit (not shown). The light-emitting device E is an organic EL device where a light-emitting layer made of an organic EL material is interposed between an anode and a cathode facing each other. As shown in FIG. 19, the anode of the light-emitting device E is connected to the driving transistor TDR, and the cathode thereof is connected to the feed line 16. As shown in FIG. 19, the light-emitting device E is accompanied with a capacitance C2 (capacitance value cp2).

As shown in FIG. 19, the driving transistor TDR is a P-channel transistor (for example, a thin film transistor) of which source is connected to the feed line 18 and of which drain is connected to the anode of the light-emitting device E. The capacitance device C0 has a first electrode L1 and a second electrode L2. The second electrode L2 is connected to the gate of the driving transistor TDR. The first switching device Tr1 that is a P-channel transistor is interposed between the first electrode L1 and the signal line 14. The gate of the first switching device Tr1 is connected to the scan line 12. If the scan signal GA[i] is transitioned into the low level, the first switching device Tr1 is in the ON state, so that the first electrode L1 and the signal line 14 are electrically conducted. If the scan signal GA[i] is transitioned into the high level, the first switching device Tr1 is in the OFF state, so that the first electrode L1 and the signal line 14 are not electrically conducted.

As shown in FIG. 19, the second switching device Tr2 that is a P-channel transistor is interposed between the gate of the driving transistor TDR and the reset line 24. The gate of the second switching device Tr2 is connected to the first control line 20. If the resetting signal Grst[i] is transitioned into the low level, the second switching device Tr2 is in the ON state, so that the gate of the driving transistor TDR and the reset line 24 are electrically conducted. If the resetting signal Grst[i] is transitioned into the high level, the second switching device Tr2 is in the OFF state, so that the gate of the driving transistor TDR and the reset line 24 are not electrically conducted.

As shown in FIG. 19, the third switching device Tr3 that is a P-channel transistor is interposed between the gate and drain of the driving transistor TDR. The gate of the third switching device Tr3 is connected to the second control line 22. If the control signal GC[i] is transitioned into the low level, the third switching device Tr3 is in the ON state, so that the gate and drain of the driving transistor TDR are electrically conducted. If the control signal GC[i] is transitioned into the high level, the third switching device Tr3 is in the OFF state, so that the gate and drain of the driving transistor TDR are not electrically conducted.

As shown in FIG. 19, the storage capacitance C1 is interposed between the gate and source of the driving transistor TDR. The storage capacitance C1 is an element for sustaining the gate-source voltage of the driving transistor TDR. The one electrode of the storage capacitance C1 is connected to the gate of the driving transistor TDR, and the other electrode thereof is connected to the feed line 18.

Figure 20:
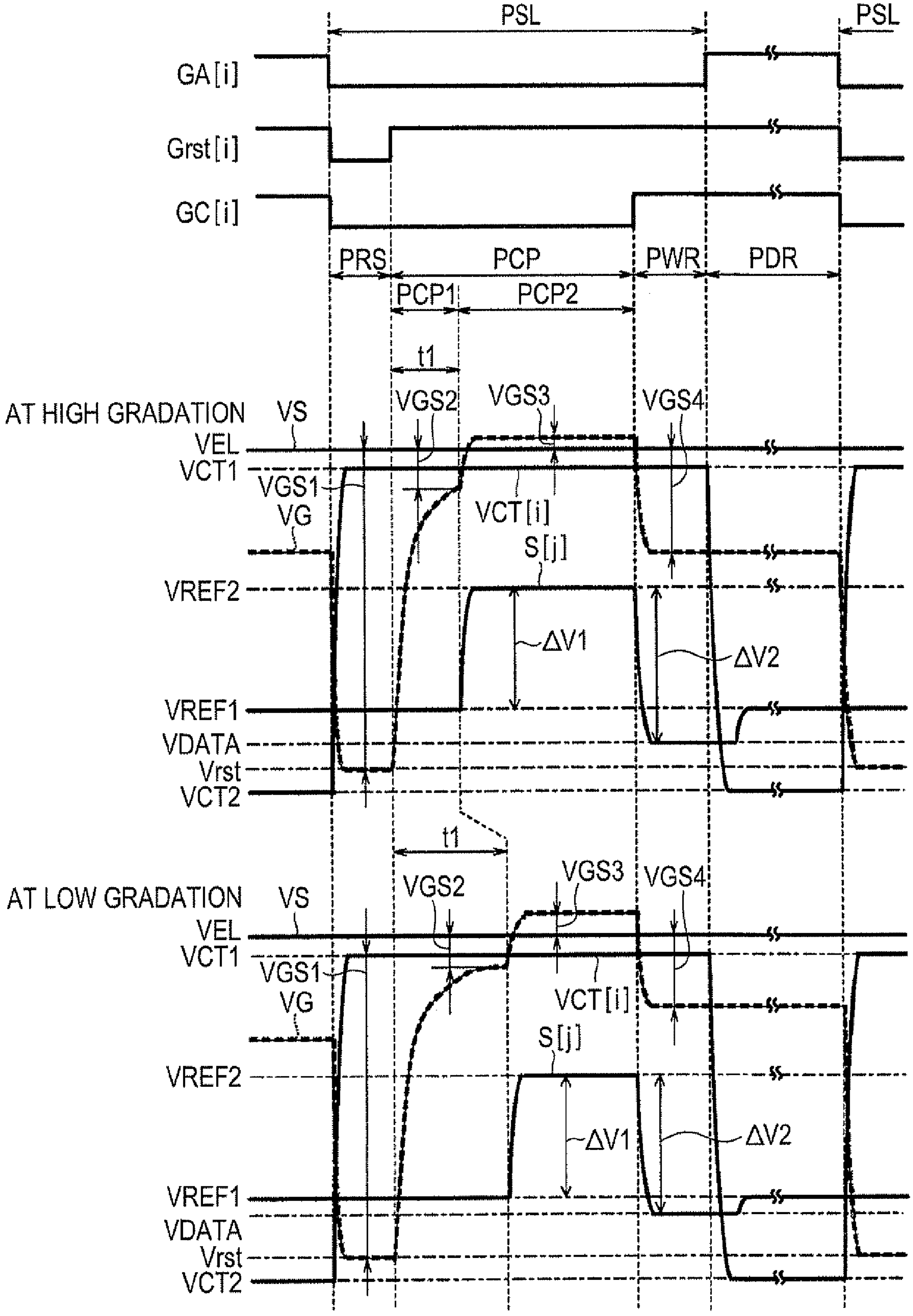
FIG. 20 is a timing chart showing operations of a light-emitting apparatus according to the fourth embodiment.

Now, operations of the driving circuit 30 (a method of driving the pixel circuit U) will be described with reference to FIG. 20, in which the description is concentrated on the j-th pixel circuit U in the i-th row. As shown in FIG. 20, the scan line driving circuit 32 sets the scan signal GA[i] to the low level in the i-th selecting period PSL in the vertical scan period. If the scan signal GA[i] is set to the low level, the first switching devices Tr1 of the n pixel circuits U in the i-th row are simultaneously transitioned into the ON state.

As shown in FIG. 20, the selecting period PSL includes a resetting period PES, a compensating period PCP, and a writing period PWR. In the resetting period PRS, the driving transistor TDR is electrically conducted by resetting the gate voltage VG of the driving transistor TDR. In the compensating period PCP after the elapse of the resetting period PES, the gate-source voltage VGS of the driving transistor TDR is asymptotically converged to a threshold voltage VTH of the driving transistor TDR by allowing the driving transistor TDR to be in the diode connection state. In the writing period PWR after the elapse of the compensating period PCP, the voltage VGS of the driving transistor TDR is changed from the voltage set in the compensating period PCP to a voltage corresponding to the gradation value D designated to the pixel circuit U. In the driving period PDD after the elapse of the selecting period PSL, the driving current IDR corresponding to the voltage VGS of the driving transistor TDR is supplied to the light-emitting device E. The light-emitting device E emits light with a luminance corresponding to the driving current IDR. Next, the operations of the pixel circuit U in the resetting period PRS, the compensating period PCP, the writing period PWR, and the driving period PDR will be described in detail.

Figure 21:
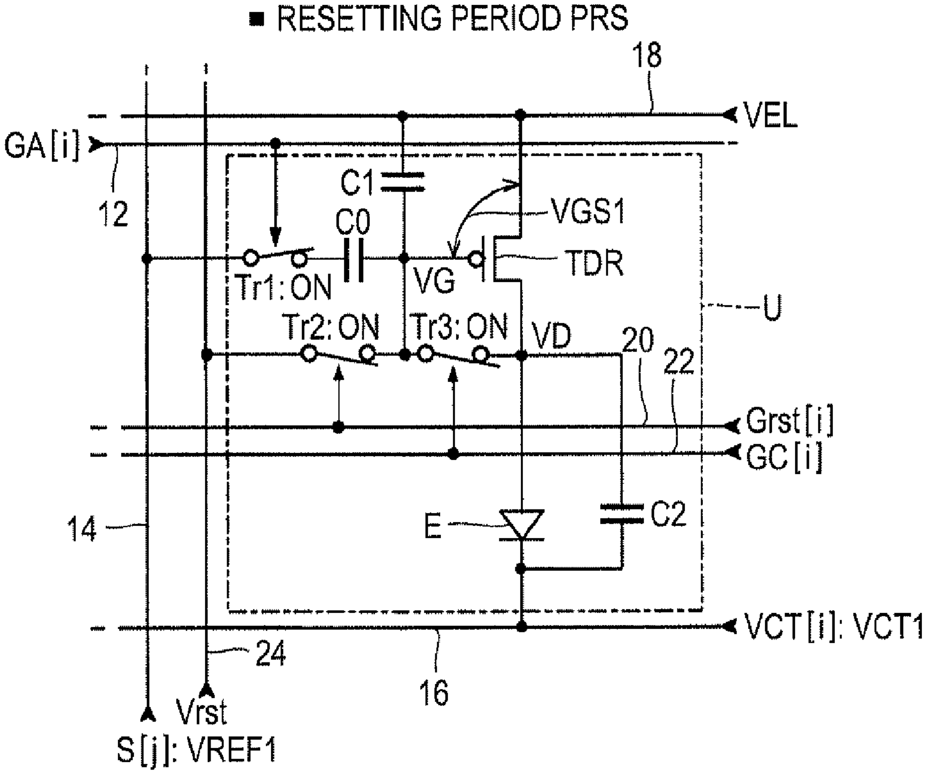
FIG. 21 is a circuit view showing a state of the pixel circuit in a resetting period.

[1] Resetting Period PRS (FIG. 21)

As shown in FIG. 20, the driving circuit 30 (for example, the scan line driving circuit 32) sets the resetting signal Grst[i] to the low level. Therefore, as shown in FIG. 21, the second switching device Tr2 is transitioned into the ON state, and the gate of the driving transistor TDR is electrically connected through the second switching device Tr2 to the reset line 24. Accordingly, the gate voltage VG of the driving transistor TDR is set to the resetting voltage Vrst. In addition, the source voltage VS of the driving transistor TDR is maintained at a constant voltage VEL (>Vrst). Therefore, the gate-source voltage VGS of the driving transistor TDR is reset to a voltage difference VGS1 (=VEL−Vrst) between the constant voltage VEL and the resetting voltage Vrst.

The resetting voltage Vrst is set so that the gate-source voltage VGS1 of the driving transistor TDR is sufficiently higher than the threshold voltage VTH of the driving transistor TDR, as expressed by the following Equation (1). Therefore, in the resetting period PRS, the driving transistor TDR is in the ON state.

$$VGS1 = VEL - Vrst >> VTH \quad (1)$$

As shown in FIG. 21, the voltage control circuit 36 sets the voltage VCT[i] that is output to the feed line 16 to the first voltage VCT1. The first voltage VCT1 is set so that a voltage difference (=VEL−VCT1) between the voltage VEL of the feed line 18 and the voltage VCT1 is sufficiently lower than the threshold voltage VTH_OLED of the light-emitting device E, as expressed by the following Equation (2). Therefore, in the resetting period PRS, the light-emitting device F is in the OFF state (non-emitting state).

$$VEL - VCT1 < VTH\_OLED \quad (2)$$

In addition, as shown in FIG. 20, the driving circuit 30 sets the control signal GC[i] to the low level. Therefore, as shown in FIG. 21, the third switching device Tr3 is transitioned into the ON state, and the drain and gate of the driving transistor TDR are connected to each other (that is, in the diode connection state) through third switching device Tr3. As described above, since the gate of the driving transistor TDR is electrically conducted through the second switching device Tr2 to the reset line 24, the drain of the driving transistor TDR is electrically conducted through the third switching device Tr3 and the second switching device Tr2 to the reset line 24. As a result, the drain voltage of the driving transistor TDR is set (reset) to the resetting voltage Vrst.

As described above, since the driving transistor TDR is in the ON state and the light-emitting device E is in the OFF state, the current Ids flowing between the source and drain of the driving transistor TDR flows from the drain of the driving transistor TDR through the third switching device Tr3 and the second switching device Tr2 into the reset line 24. The current Ids is expressed by the following Equation (3). In Equation (3), μ is a mobility of the driving transistor TDR. In addition, W/L is a relative ratio of the channel width W to the channel length L of the driving transistor TDR, and Cox is a capacitance per unit area of a gate insulating layer of the driving transistor TDR.

$$Ids=\frac{1}{2}\cdot\mu\cdot W/L\cdot Cox\cdot(VGS-VTH)^2 \quad (3)$$

In addition, as shown in FIGS. 20 and 21, the signal line driving circuit 34 sets the signal S[j] to the first reference voltage VREF1. In the resetting period PRS, since the first switching device Tr1 is in the ON state, the first electrode L1 of the capacitance device C0 is electrically conducted through the first switching device Tr1 to the signal lines 14. Therefore, the voltage of the first electrode L1 is set to the first reference voltage VREF1. On the other hand, the since the voltage of the second electrode L2 of the capacitance device C0 (that is, the gate voltage VG of the driving transistor TDR) is set to the resetting voltage Vrst, the voltage across the capacitance device C0 is maintained at the voltage VREF1−Vrst.

Figure 22:
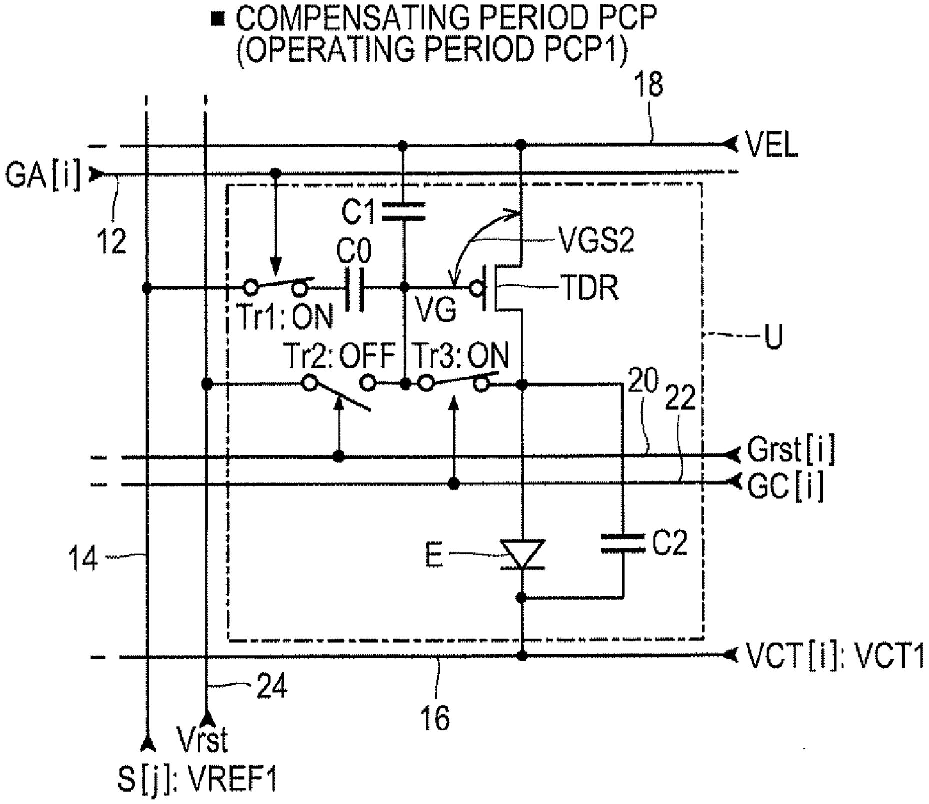
FIG. 22 is a circuit view showing a state of the pixel circuit in an operating period of a compensating period.
Figure 23:
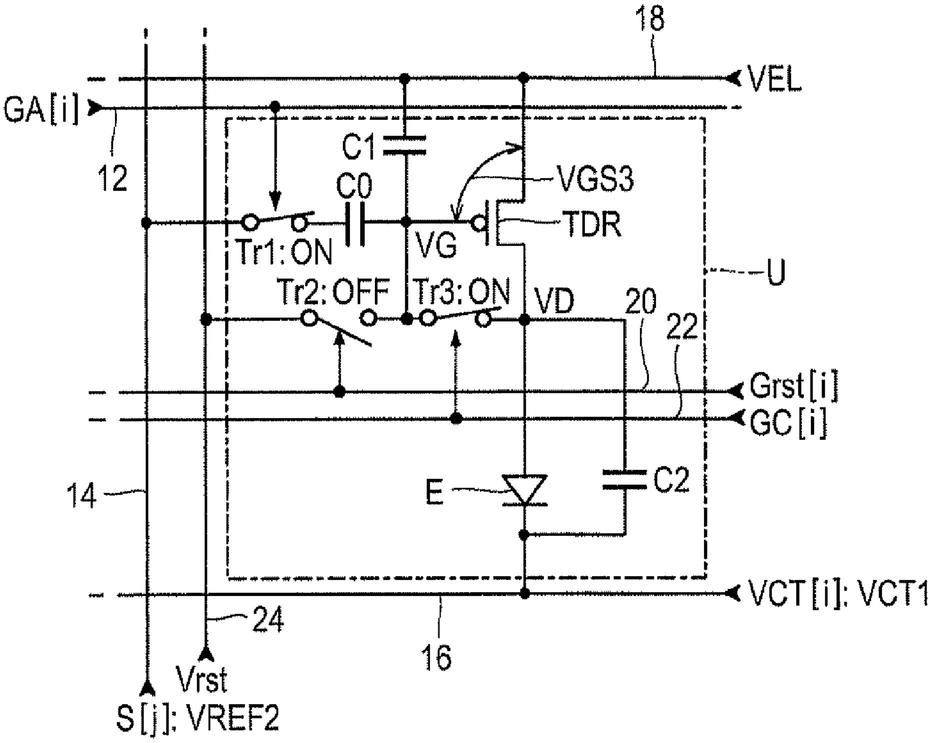
FIG. 23 is a circuit view showing a state of the pixel circuit in a sustaining period of a compensating period.

[2] Compensating Period PCP (FIGS. 22 and 23)

As shown in FIG. 20, the compensating period PCP is divided into an operating period PCP1 and a sustaining period PCP2. The operating period PCP1 is a period from the starting point of the compensating period PCP (that is, the ending point of the resetting period PRS) to the time point when the time duration t1 elapses from the starting point of the compensating period PCP. The sustaining period PCP2 is a remaining period of the compensating period PCP (that is, a period from the ending point of the operating period PCP1 to the ending point of the compensating period PCP). The time duration t1 of the operating period PCP1 is variably set according to the gradation value D designated to the pixel circuit U. More specifically. As shown in FIG. 20, the time duration t1 of a case where the gradation value D indicates a high gradation (high luminance) is relatively shorter than the time duration t1 of a case where the gradation value D indicates a low gradation (low luminance). The setting of the time duration t1 of the operating period PCP1 will be described later.

As shown in FIG. 20, if the operating period PCP1 starts, the driving circuit 30 sets the resetting signal Grst[i] to the high level. Therefore, as shown in FIG. 22, the second switching device Tr2 is transitioned into the OFF state. On the other hand, the control signal GC[i] is maintained at the low level so that the driving transistor TDR is continuously in the diode connection state. In addition, the voltage control circuit 36 maintains the voltage VCT[i] to the first voltage VCT1, and the signal line driving circuit 34 maintains the signal S[j] to the first reference voltage VREF1.

Therefore, the current Ids of Equation (3) flows into the gate of the driving transistor TDR through the third switching device Tr3. Accordingly, the capacitance device C0 and the storage capacitance C1 are charged with electric charges, so that the gate voltage VG of the driving transistor TDR is gradually increased, as shown in FIG. 20. Since the source voltage VS of the driving transistor TDR is fixed to the voltage VEL of the feed line 18, the gate-source voltage VGS of the driving transistor TDR is decreased together with an increase in the gate voltage VG. As understood from Equation (3), the current Ids is decreased as much amount as the voltage VGS is decreased to approach the threshold voltage VTH. Therefore, in the operating period PCP1 of the compensating period PCP, the voltage VGS of the driving transistor TDR is decreased with the passing of time from the voltage VGS1 (VGS1=VEL−Vrst) set in the resetting period PRS to be asymptotically converged to the threshold voltage VTH.

The operation of asymptotically causing the voltage VGS to converge with the threshold voltage VTH (hereinafter, referred to as a "first compensating operation") is stopped at the starting point of the sustaining period PCP2 (that is, the time point when the time duration t1 elapses from the starting point of the compensating period PCP) before the voltage VGS approaches the threshold voltage VTH. The gate-source voltage VGS of the driving transistor TDR is set to the voltage VGS2 of the starting point of the sustaining period PCP2. Now, the stopping of the first compensating operation will be described in detail.

As shown in FIGS. 20 and 23, if the sustaining period PCP2 starts, the signal line driving circuit 34 changes the signal S[j] to the second reference voltage VREF2. In the embodiment, the second reference voltage VREF2 is higher than the first reference voltage VREF1 (refer to FIG. 20). Since the first switching device Tr1 is continuously maintained in the ON state in this period as well as the operating period PCP1, the voltage of the first electrode L1 of the capacitance device C0 is changed from the first reference voltage VREF1 to the second reference voltage VREF2. In addition, the gate voltage VG of the driving transistor TDR is changed (increased) according to a change ΔV1·(ΔV1=VREF2−VREF1) of the voltage of the first electrode L1. The change of the voltage VS just after the start of the sustaining period PCP2 corresponds to a voltage (ΔV1·cp0/(cp0+cp1+cp2)) that is obtained by dividing the change ΔV1 of the voltage of the first electrode L1 according to a capacitance ratio of the capacitance device C0, the storage capacitance C1, and the capacitance C2. Therefore, the gate-source voltage VGS3 of the driving transistor TDR just after the start of the sustaining period PCP2 is expressed by the following Equation (4) by using the gate-source voltage VGS2 of the driving transistor TDR of the ending point of the operating period PCP1.

$$VGS3=VGS2-\Delta V1-cp0/(cp0+cp1+cp2) \quad (4)$$

The second reference voltage VREF2 is set so that the voltage VGS3 of Equation (4) is lower than the threshold voltage VTH of the driving transistor TDR. Therefore, in the sustaining period PCP2, the driving transistor TDR is transitioned into the OFF state by changing the voltage of the first electrode L1 of the capacitance device C0 from the first reference voltage VREF1 to the second reference voltage VREF2. Accordingly, the first compensating operation of asymptotically causing the gate-source voltage VGS of the driving transistor TDR to converge with the threshold voltage VTH is stopped at the same time as the sustaining period PCP2 starts, the voltage VGS of the driving transistor TDR is maintained at the voltage VGS3 of Equation (4) until the ending point of the sustaining period PCP2.

Figure 24:
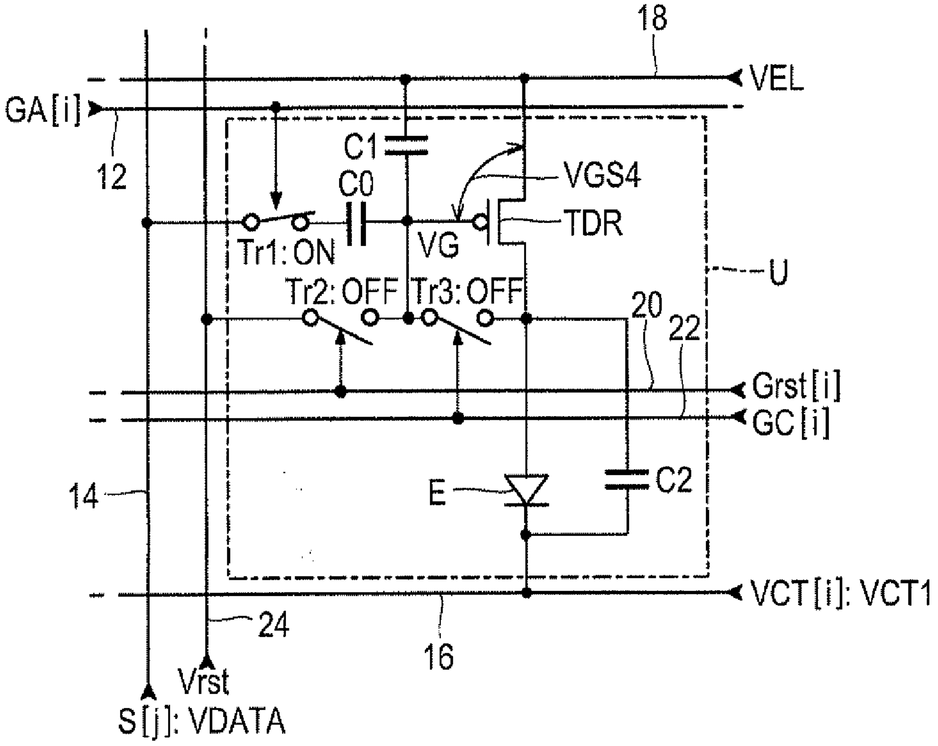
FIG. 24 is a circuit view showing a state of the pixel circuit in a writing period.

[3] Writing Period PWR (FIG. 24)

As shown in FIG. 20, if the writing period PWR starts, the driving circuit 30 sets the control signal GC[i] to the high level. Therefore, as shown in FIG. 24, the third switching device Tr3 is transitioned into the OFF state, the diode connection of the driving transistor TDR is released. Accordingly, the gate of the driving transistor TDR is in the electrically floating state.

As shown in FIG. 24, the signal line driving circuit 34 changes the signal S[j] to the gradation voltage VDATA. The gradation voltage VDATA is variably set according to the gradation value D designated to the pixel circuit U (light-emitting device E). Since the first switching device Tr1 is maintained the ON state even in the writing period PWR, the voltage of the first electrode L1 of the capacitance device C0 is changed from the second reference voltage VREF2 set in the sustaining period PCP2 to the gradation voltage VDATA. The gate voltage VG of the driving transistor TDR is changed according to the change ΔV2 (ΔV2=VDATA−VREF2) of the first electrode L1. The change of the voltage VG just after the start of the writing period PWR corresponds to a voltage ($\Delta V2 - cp0/(cp0+cp1)$) that is obtained by dividing the change $\Delta V2$ of the voltage of the first electrode L1 according to a capacitance ratio of the capacitance device C0 and the storage capacitance C1.

Therefore, the gate-source voltage VGS4 of the driving transistor TDR just after the writing period PWR is expressed by the following Equation (5). In this manner, the voltage VGS4 is set according to the gradation voltage VDATA, so that the driving transistor TDR is changed into the ON state.

$$\begin{aligned} VGS4 &= VGS3 - \Delta V2 \cdot cp0/(cp0+cp1) \\ &= \{VGS2 - \Delta V1 \cdot cp0/(cp0+cp1+cp3)\} - \\ &\quad \Delta V2 \cdot cp0/(cp0+cp1) \\ &= VGS2 - (VREF2 - VREF1) \cdot cp0/(cp0+cp1+cp3) - \\ &\quad (VDATA - VREF2) \cdot cp0/(cp0+cp1) \end{aligned} \tag{5}$$

Figure 25:
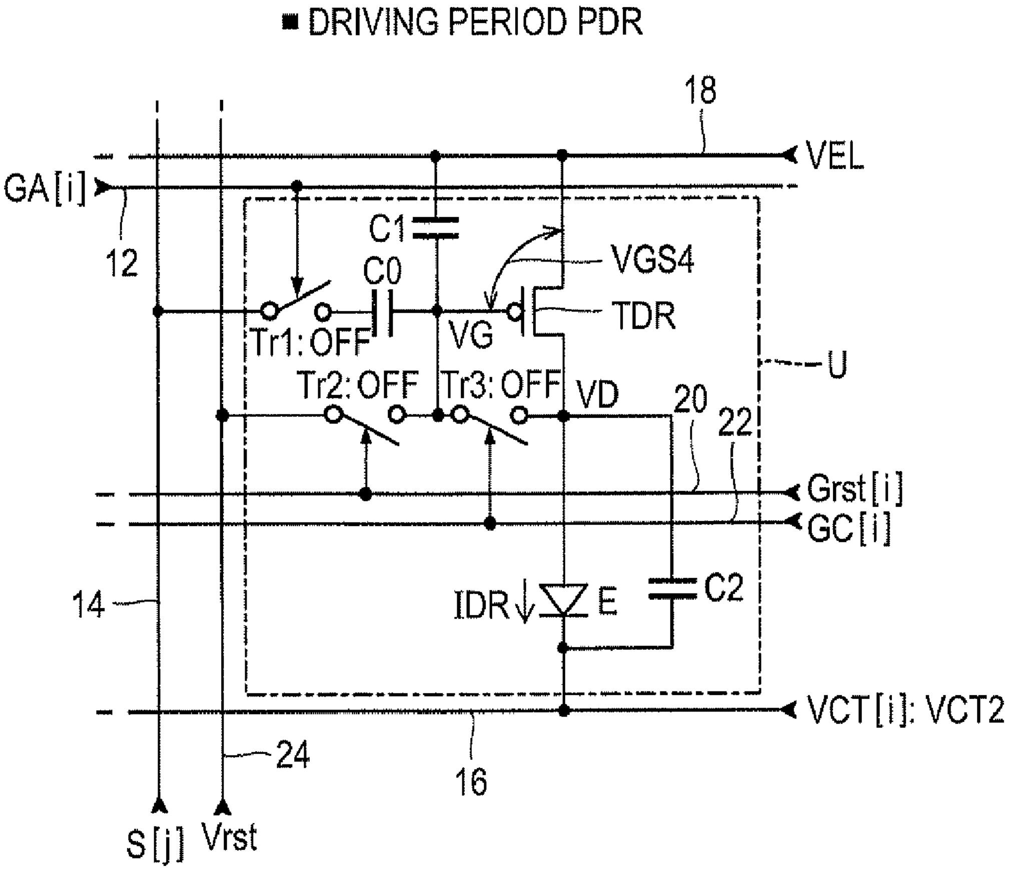
FIG. 25 is a circuit view showing a state of the pixel circuit in a driving period.

[4] Driving Period PDR (FIG. 25)

As shown in FIG. 20, if the driving period PDR starts, the driving circuit 30 changes the scan signal GA[i] to the high level (inactive level). Therefore, as shown in FIG. 25, the first switching device Tr1 of each of the pixel circuits U in the i-th row is changed into the OFF state, so that the application of the voltage to the first electrode L1 of the capacitance device C0 is stopped.

In addition, as shown in FIGS. 20 and 25, the voltage control circuit 36 sets the voltage VCT[i] output to the feed line 16 to the second voltage VCT2. The second voltage VCT2 is set so that a voltage difference (=VEL−VCT2) between the voltage VEL the feed line 18 and the second voltage VCT2 is sufficiently higher than the threshold voltage VTH_OLED of the light-emitting device E, as expressed by the following Equation (6).

$$VEL - VCT2 >> VTH\_ODED \tag{6}$$

In this case, the current Ids of Equation (3) flows into the light-emitting device E, so that the capacitance C2 is charged. Therefore, in the state that the gate-source voltage VGS of the driving transistor TDR is maintained at the voltage VGS4 of Equation (5), the voltage across the capacitance C2 (that is, the drain voltage of the driving transistor TDR) is gradually increased In addition, at the time that the voltage across the capacitance C2 approaches the threshold voltage VTH_OLED of the light-emitting device E, the current Ids is supplied as the driving current IDR to the light-emitting device E. The driving current IDR is expressed by the following Equation (7).

$$IDR = \tfrac{1}{2} \cdot \mu \cdot W/L \cdot Cox \cdot (VGS4 - VTH)^2 \tag{7}$$

In this manner, since the driving current IDR is controlled to a current amount according to the voltage VGS4 corresponding to the gradation voltage VDATA, the light-emitting device E emits light with a luminance corresponding to the gradation voltage VDATA (that is, the gradation value D). The light emitting of the light-emitting device E is maintained until the starting point of the selecting period PSL where the scan signal GA[i] becomes in the active level. Until now, the operations of the pixel circuit U are described.

Figure 26:
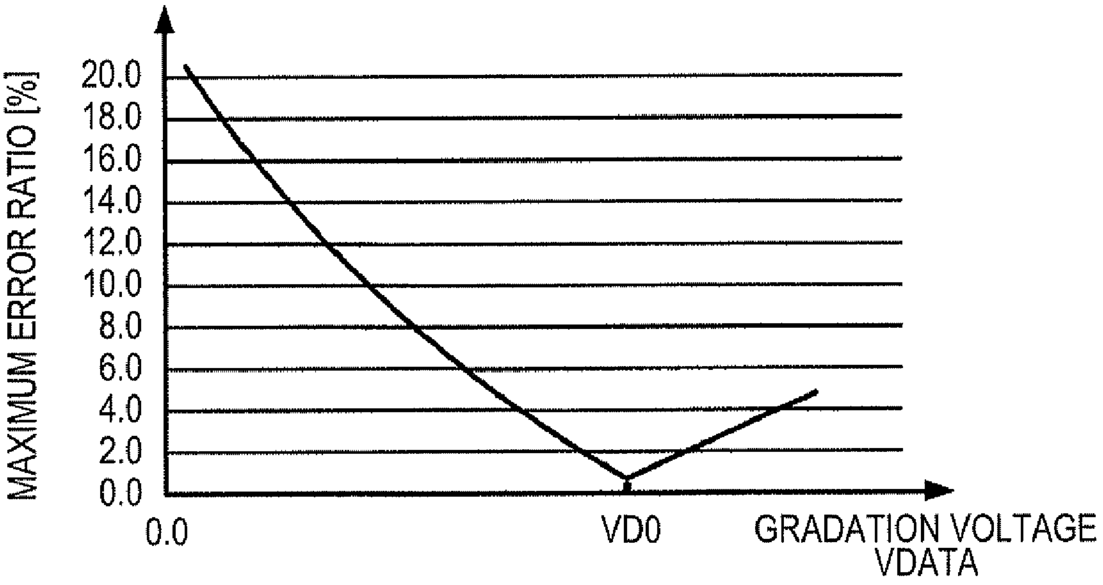
FIG. 26 is a graph showing a relationship between a gradation voltage and errors in a driving current in a comparative example.

Next, FIG. 26 is a graph showing a relationship between the gradation voltage VDATA and an error of an amount of the driving current IDR in a construction (hereinafter, referred to as a "comparative example") where the time duration t1 when the compensating operation is continuously performed is fixed to a predetermined value. In FIG. 26, the horizontal axis denotes a voltage value of a gradation voltage VDATA of which reference value is the first reference voltage VREF1, and the vertical axis denotes a relative ratio (maximum error ratio) of maximum and minimum values with respect to the amount of the driving current IDR in a case where the same gradation value D is designated. In the comparative example, the time duration t1 is set to a sufficient time duration so that the voltage VGS of the driving transistor TDR approaches the threshold voltage VTH.

As understood from FIG. 26, in a case where the time duration t1 of the compensating operation is set to a fixed value, when the gradation voltage VDATA is set to a predetermined value VD0, errors in the driving current IDR can be reliably decreased. However, when the gradation voltage VDATA is separated from the predetermined value VD0, errors in the driving current IDR is increased in proportion to the separation. The comparative example has a problem in that it is difficult to remove errors in the driving current IDE over a wide range of the gradation voltage VDATA.

Figure 27:
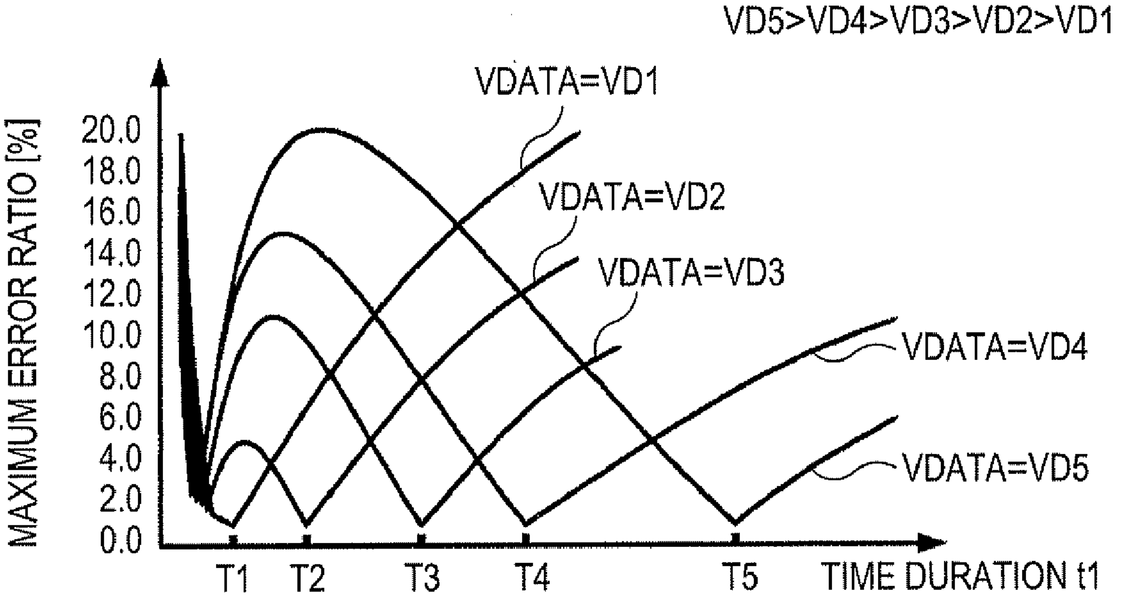
FIG. 27 is a graph showing a relationship between the time duration of an operating period and errors in the driving current.

FIG. 27 is a graph showing relationships between the time duration t1 of the operating period PCP1 and the error (maximum error ratio) of the driving current IDR with respect to a plurality of varied gradation voltages VDATA (VD1<VD2<VD3<VD4<VD5) in the embodiment. The tendency in that the time duration t1 in which errors in the driving current IDR is minimized differs according to the gradation voltage VDATA can be seen from FIG. 27. In other words, the time duration t1 in which errors in the driving current IDR is minimized is decreased in an inverse proportion to a decrease in the gradation voltage VDATA.

Figure 28:
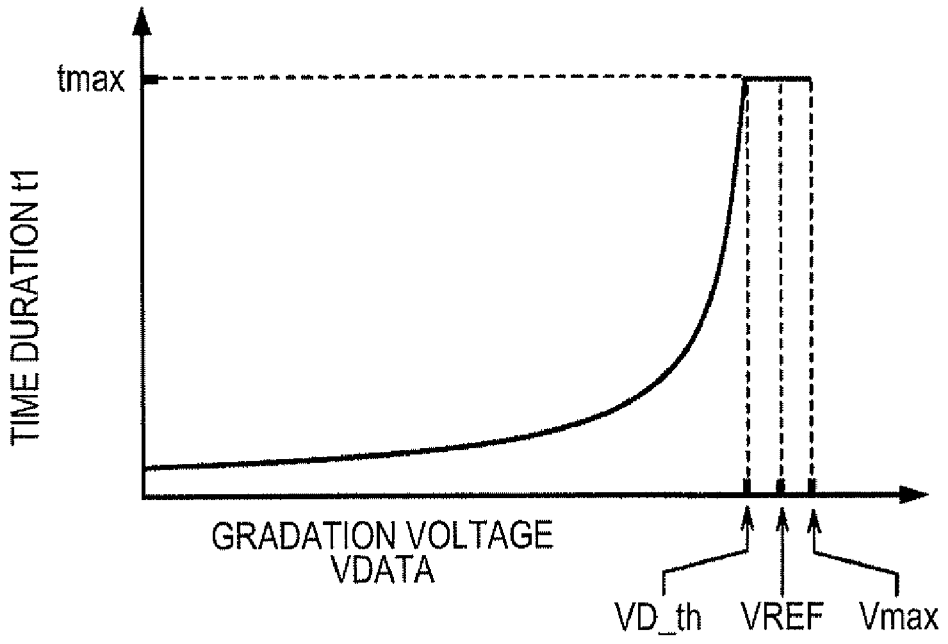
FIG. 28 is a graph showing a relationship between the gradation voltage and the time duration of the operating period.

In this manner, in the embodiment, the time duration t1 of the operating period PCP1 is variably set according to the gradation value D (gradation voltage VDATA), so that errors in the driving current IDR can be suppressed irrespective of the gradation voltage VDATA. FIG. 28 is a graph showing a relationship between the gradation voltage VDATA and the time duration t1 of the operating period PCP1. As shown in FIG. 28, the time duration t1 is set according to the gradation voltage VDATA so that the time duration t1 of the operating period PCP1 is decreased by an decrease of the gradation voltage VDATA (that is, an increase in the change of the gate voltage VG of the driving transistor TDR just after the start of the writing period PWR). For example, in the writing period PWR, in a case where the gradation voltage VDATA is set to the voltage VD1 of FIG. 27, the operating period PCP1 is set to a time duration T1; and in a case where the gradation voltage VDATA is set to the voltage VD2 that is higher than the voltage VD1, the operating period PCP1 is set to a time duration T2 that is longer than the time duration T1.

However, the higher is the gradation voltage VDATA, the longer is the time duration t1 for minimizing errors in the driving current IDR. Therefore, even in a case where the gradation voltage VDATA is sufficiently high (for example, a case where the minimum gradation is designated), there is a need for setting the time duration t1 to an excessively long time in order to completely minimize errors in the driving current IDR. In the embodiment, as shown in FIG. 28, in a case where the gradation value D lower than a predetermined value is designated (a case where the gradation voltage VDATA is higher than the voltage VD_th of FIG. 28), the signal line driving circuit 34 (time adjuster 46 of the unit circuit 40) sets (clips) the time duration t1 of the operating period PCP1 to a predetermined value tmax that does not depend on the gradation value D. The maximum value tmax is limited to a time that is shorter than the time duration needed for decreasing the voltage VGS of the driving transistor TDR down to the threshold voltage VTH by the compensating operation. According to the above construction, it is possible to shorten the compensating period PCP (and the selecting period PSL).

As described with reference to FIG. 20, the first compensating operation in the operating period PCP1 is ended by changing the signal S[j] from the first reference voltage VREF1 to the second reference voltage VREF2. Each of the unit circuits 40 of the signal line driving circuit 34 variably controls the time duration t1 of the operating period PCP1 by adjusting the time of changing the signal S[j] from the first reference voltage VREF1 to the second reference voltage VREF2, according to the gradation value D.

Figure 29:
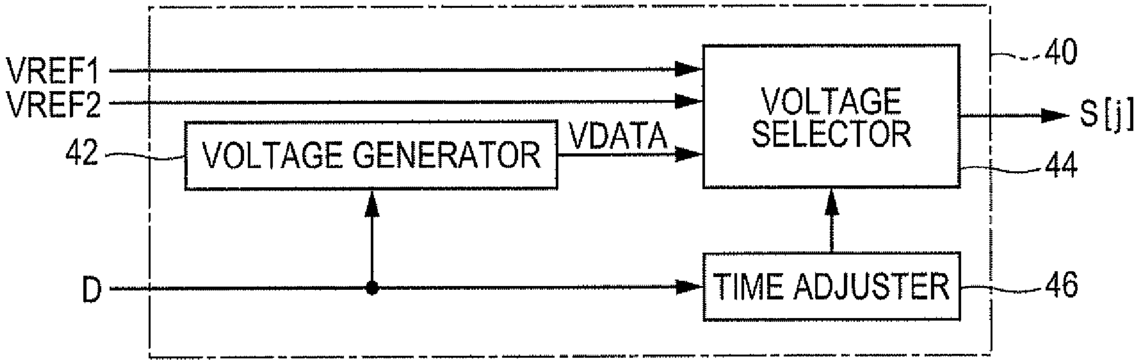
FIG. 29 is a block diagram showing a unit circuit in a signal line driving circuit.

FIG. 29 is a block diagram showing the unit circuit 40 of the signal line driving circuit 34. In FIG. 29, one unit circuit 40 that generates and outputs the signal S[j] is shown as a representation. As shown in FIG. 29, the unit circuit 40 includes a voltage generator 42, a voltage selector 44, and a time adjuster 46. The gradation value D of the j-th pixel circuit U is applied to the voltage generator 42 and the time adjuster 46.

The voltage generator 42 generates the gradation voltage VDATA corresponding to the gradation value D. For example, a voltage-output D/A converter is used for the voltage generator 42. The first reference voltage VREF1 and the second reference voltage VREF2 that are generated by a power supply circuit (not shown) and the gradation voltage VDATA that is generated by the voltage generator 42 are applied to the voltage selector 44. The voltage selector 44 selectively outputs one of the first reference voltage VREF1, the second reference voltage VREF2, and the gradation voltage VDATA as the signal S[j] to the signal line 14. More specifically, the voltage selector 44 outputs the first reference voltage VREF1 in the resetting period PRS and the operating period PCP1 of the compensating period PCP, the second reference voltage VREF2 in the sustaining period PCP2 of the compensating period PCP, and the gradation voltage VDATA in the writing period PWR.

The time adjuster 46 variably controls the time in which the voltage selector 44 changes the voltage of the signal S[j] from the first reference voltage VREF1 to the second reference voltage VREF2 (that is, the boundary between the operating period PCP1 and the sustaining period PCP2 of the compensating period PCP) according to the gradation value D. For example, a counter that starts counting at the starting point of the compensating period PCP and outputs to the voltage selector 44 a voltage transition (VREF1→VREF2) command at the time point in which the count value approaches a value corresponding to the gradation value D (that is, at the time point after the elapse of the time duration t1 from the starting point of the counting) is used for the time adjuster 46. As described above, the time adjuster 46 sets the maximum value tmax as the upper limit of the time duration t1.

The time duration t1 of the operating period PCP1 is controlled according to the gradation value D (that is, the gradation voltage VDATA) in the above-described construction. Since the time duration t1 is set to be shorter than a time needed for decreasing the voltage VGS of the driving transistor TDR from the voltage VGS1 of the ending point of the resetting period PRS to the threshold voltage VTH, the gate-source voltage VGS2 of the driving transistor TDR of the ending point of the operating period PCP1 is changed according to the time duration t1, but it does not approach the threshold voltage VTH. Therefore, the operation of controlling the time duration t1 of the operating period PCP1 according to the gradation value D can be understood as an operation of variably controlling the voltage VGS2 of the ending point of the operating period PCP1 according to the gradation value D. In addition, a total of the time duration of the compensating period PCP is fixed. Therefore, the sustaining period PCP2 is decreased in an inverse proportion to an increase of the operating period PCP1 that is increased.

In addition, main causes of errors in the driving current IDR are errors of the threshold voltage VTH and mobility μ of the driving transistor TDR. In order to compensate for the only error of the threshold voltage VTH, as disclosed in Patent Document 1, there is a need for matching the voltage VGS of the driving transistor TDR with the threshold voltage VTH in the compensating period PCP. In the embodiment, although the voltage VGS of the driving transistor TDR in the compensating period PCP does not approach the threshold voltage VTH, errors in the driving current IDR can be reliably suppressed by adjusting the time duration t1, as shown in FIG. 27. Since errors in the mobility μ as well as errors in the threshold voltage VTH is compensated by adjusting the time duration t1, errors in the driving current IDR can be suppressed irrespective of the fact that the voltage VGS in the compensating period PCP does not approach the threshold voltage VTH. Accordingly, in the embodiment, the time duration t1 is variably controlled so that both the threshold voltage VTH and the mobility μ of the driving transistor TDR are compensated.

Figure 30:
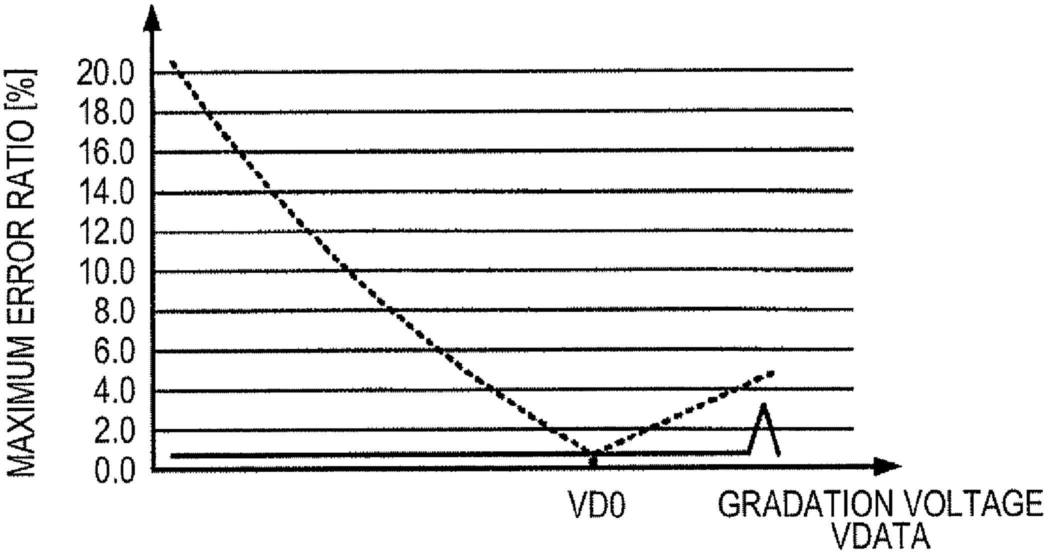
FIG. 30 is a graph for explaining an effect of the fourth embodiment.

FIG. 30 is a graph showing a relationship between the gradation voltage VDATA and errors in the driving current IDR in the embodiment, which is plotted with a solid line. In FIG. 30, the relationship (FIG. 26) between the gradation voltage VDATA and errors in the driving current IDR in the comparative example is also plotted with a dashed line. As shown in FIG. 30, according to the embodiment, in comparison with the construction of Patent Document 1 where the time duration of the compensating operation is fixed, there is an advantage in that errors in the driving current IDR can be suppressed over a wide range of the gradation voltage VDATA.

In addition, a slight increase in errors in the driving current IDE in a high gradation region of the gradation voltage VDATA in FIG. 30 is considered to be caused from the influence of a limitation of the upper limit of the time duration t1 to the maximum value tmax. If errors in the driving current IDR occurs in the low gradation, in a case where the gradation value D indicates, for example, the lowest gradation (that is, black display), an amount of the driving current IDR needs to be set to zero. However, the driving current IDR may be supplied to the light-emitting device E (and thus, the light-emitting device E emits light). For this reason, in the embodiment, in a case where the gradation value indicates the lowest gradation, the gradation voltage VDATA is set to the voltage Vmax (refer to FIG. 28) that is higher than the first reference voltage VREF1. In the maximum value tmax, since the voltage VGS of the driving transistor TDR is set to be lower than the threshold voltage VTH, there is an advantage in that the amount of the driving current IDR in case of the gradation value indicating the lowest gradation can be reliably set to zero in a case where the gradation value indicates the lowest gradation, irrespective of the construction that the time duration t1 of the operating period PCP1 is limited to the maximum value tmax.

E: Fifth Embodiment

Now, a fifth embodiment of the invention will be described. The embodiment is different from the fourth embodiment in that the driving transistor TDR is continuously in the diode connection state in the writing period PWR as well as the compensating period PCP. The other constructions are the same as those of the fourth embodiment.

Figure 31:
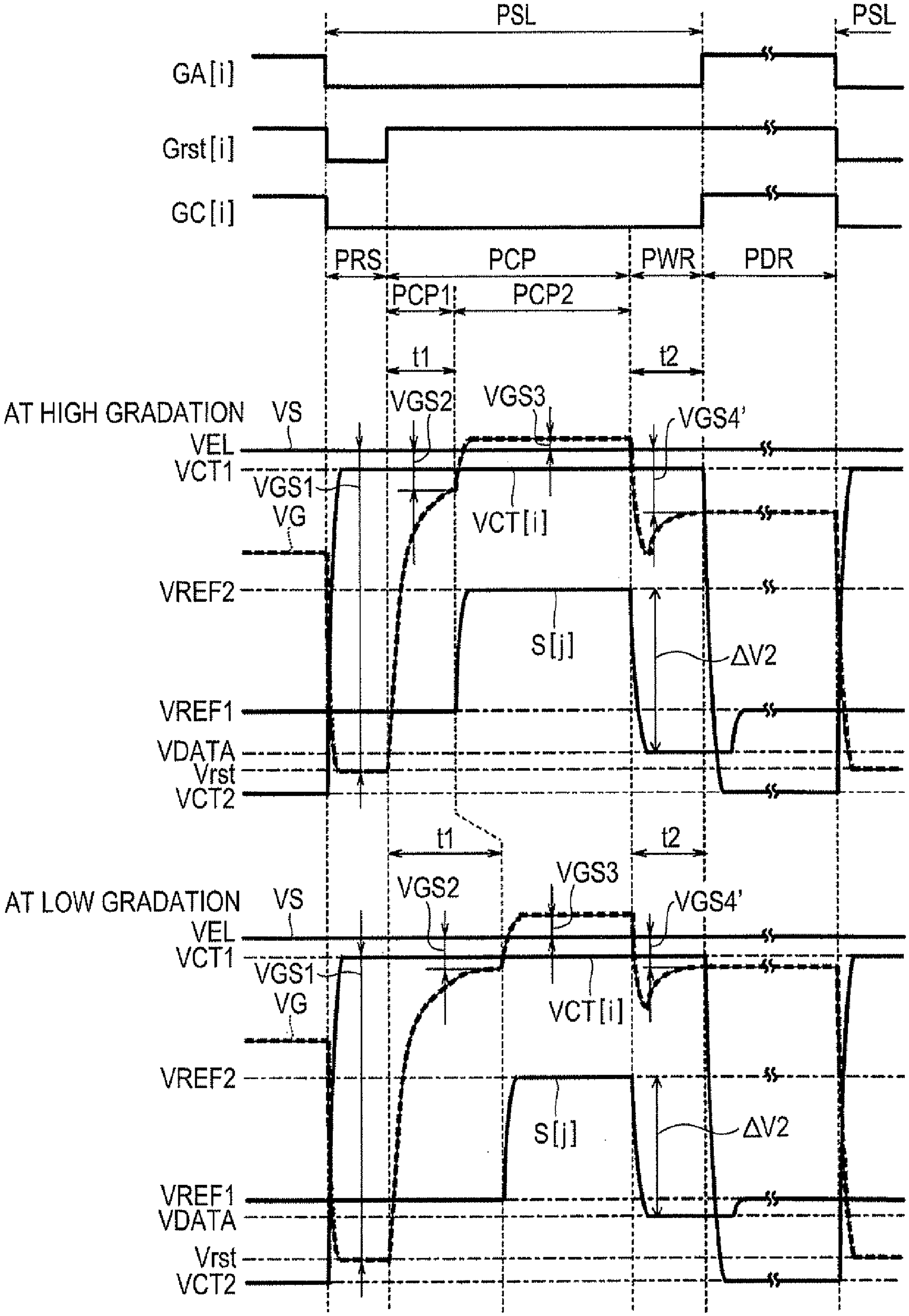
FIG. 31 is a timing chart showing operations of a light-emitting apparatus according to a fifth embodiment of the invention.

FIG. 31 is a timing chart showing operations of a light-emitting apparatus according to the embodiment. As shown in FIG. 31, in the writing period PWR, the driving circuit 30 continuously sets the control signal GC[i] to the low level in this period as well as the compensating period PCP. Therefore, the third switching device Tr3 is maintained in the ON state, and the driving transistor TDR is continuously in the diode connection state.

As described above, if the writing period PWR starts, the voltage of the first electrode L1 is changed from the second reference voltage VREF2 to the gradation voltage VDATA. The gate voltage VG of the driving transistor TDR is changed according to the change ΔV2 (=VDATA−VREF2) of the voltage of the first electrode L1. In the embodiment, since the driving transistor TDR is continuously in the diode connection state in the writing period PWR as well as the compensating period PCP, the gate and drain of the driving transistor TDR are electrically conducted. Therefore, the change of the voltage VG just after the start of the writing period PWR corresponds to a voltage (ΔV2·cp0/(cp0+cp1+cp2)) that is obtained by dividing the change ΔV2 of the voltage of the first electrode L1 with a capacitance ratio of the capacitance device C0, the storage capacitance C1, and the capacitance C2 accompanied with the light-emitting device E.

Therefore, the gate-source voltage VGS4 of the driving transistor TDR just after the start of the writing period PWR is expressed by the following Equation (8) instead of the Equation (5). In this manner, the voltage VGS4 is set according to the gradation voltage VDATA (more specifically, the voltage difference between the gradation voltage VDATA and the first reference voltage VREF1, so that the driving transistor TDR is changed into the ON state.

$$\begin{aligned} VGS4 &= VGS3 - \Delta V2 \cdot cp0/(cp0 + cp1 + cp2) \qquad (8) \\ &= \{VGS2 - \Delta V1 \cdot cp0/(cp0 + cp1 + cp2)\} - \\ &\quad \Delta V2 \cdot cp0/(cp0 + cp1 + cp2) \\ &= VGS2 + (VREF1 - VDATA) \cdot cp0/(cp0 + cp1 + cp2) \end{aligned}$$

As described above, in the writing period PWR, since the driving transistor TDR is in the diode connection state, the current Ids of Equation (3) flows through the third switching device Tr3 into the gate of the driving transistor TDR. Accordingly, as shown in FIG. 31, the gate voltage VG of the driving transistor TDR is gradually increased. Since the source voltage VS of the driving transistor TDR is fixed to the voltage VEL, the gate-source voltage VGS of the driving transistor TDR is decreased at the same time as the gate voltage VG is increased. In other words, as shown in FIG. 31, the second compensating operation of asymptotically causing the gate-source voltage VGS of the driving transistor TDR to converge with the threshold voltage VTH is also performed in the writing period PWR.

As shown in FIG. 31, if the driving period PDR starts, the driving circuit 30 sets the control signal GC[i] to the high level. Therefore, the third switching device Tr3 is transitioned into the OFF state, so that the diode connection of the driving transistor TDR is released in the driving period PDR, in the state that the gate-source voltage VGS of the driving transistor TDR is maintained at the voltage VGS4' of the starting point of the driving period PDR, the current Ids of Equation (3) flows into the light-emitting device E. In addition, if the voltage across the capacitance C2 accompanied with the light-emitting device E approaches the threshold voltage VTH_OLED of the light-emitting device E, the current Ids is supplied as the driving current IDR to the light-emitting device E.

In the embodiment, by taking into consideration the compensating operations in the operating period PCP1 and the writing period PWR, the time duration t1 corresponding to the gradation voltage VDATA is determined based on a sum T of the time duration t1 of the operating period PCP1 and the time duration t2 of the writing period PWR. More specifically, with respect to a plurality of the gradation voltages VDATA, a sum T for minimizing errors in the driving current IDR is specified by an experiment or calculation (simulation), and a difference between the sum T and the time duration t2 (a fixed value) is determined as the time duration t1 of the operating period PCP1.

Now, a case where a time duration for performing the compensating operation in order to remove errors in the driving current IDR is T and a time duration of the writing period PWR is a fixed value t2 is considered. In a construction where the compensating operation is not performed in the writing period PWR, the time duration of the operating period PCP1 needs to be set to T. However, in the embodiment, since the compensating operation is performed in the writing period PWR as well as the operating period PCP1, the time duration of the operating period PCP1 is T−t2. Therefore, according to the embodiment, there is an advantage in that, even in a case where sufficient time duration for minimizing errors in the driving current IDR is ensured in the operating period PCP1, errors in the driving current IDR can be suppressed by using the compensating operation in the writing period PWR (that is, the second compensating operation).

F: Sixth Embodiment

Figure 32:
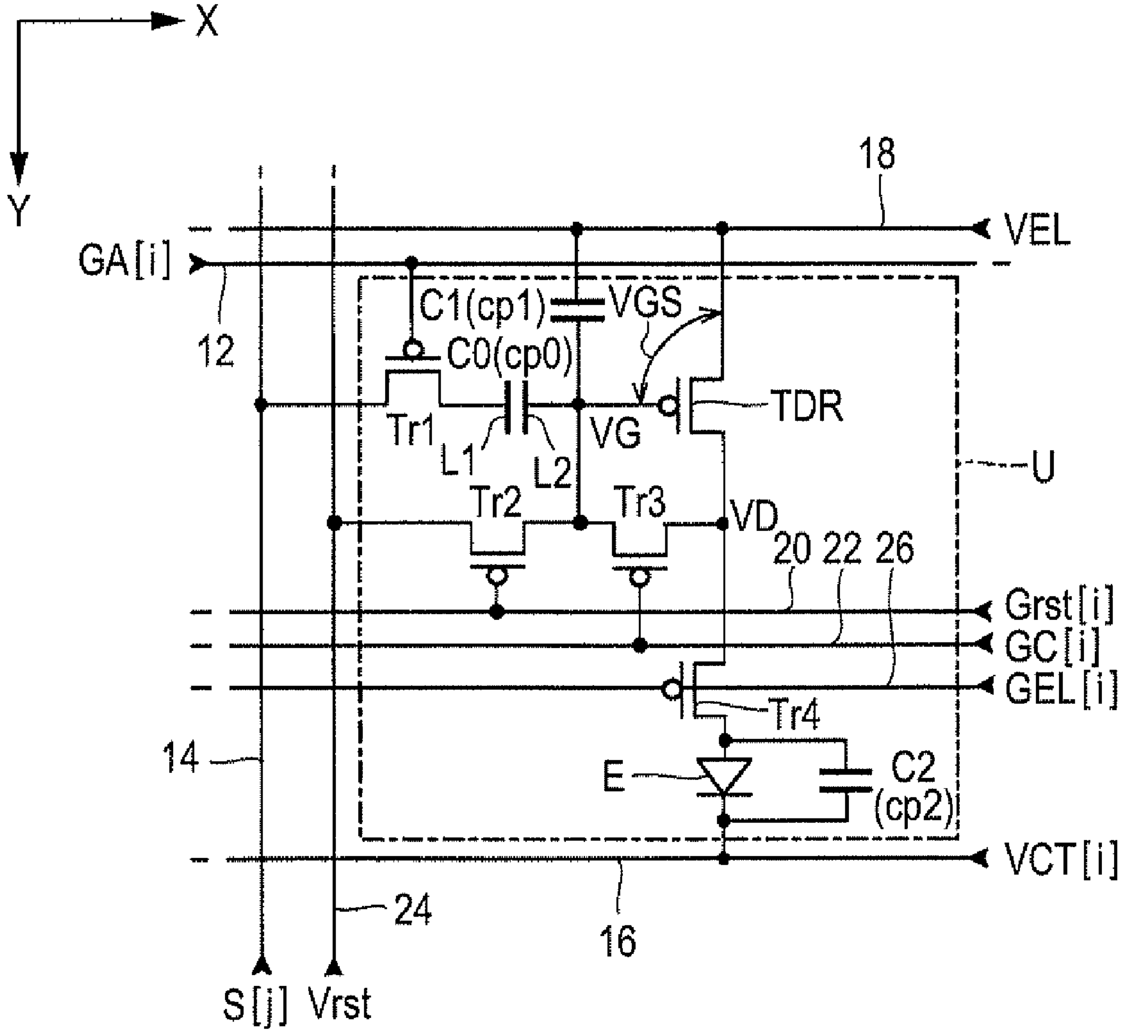
FIG. 32 is a circuit view showing a pixel circuit according to the sixth embodiment.

FIG. 32 is circuit view showing a pixel circuits U according to a sixth embodiment of the invention. In FIG. 32, one pixel circuit U of the j-th column in the i-th row is shown as a representation. As shown in FIG. 32, in the device unit 10, the third control lines 26 extending in the X direction are disposed in one-to-one correspondence with the m scan lines 12. The light-emitting control signal GEL[i] is applied from the driving circuit 30 (for example, the scan line driving circuit 32) to the third control line 26.

As shown in FIG. 32, the pixel circuit U further includes a fourth switching device Tr4 that is disposed in a path of the driving current IDR. As shown in FIG. 32, the fourth switching device Tr4 that is a P-channel transistor is interposed between the drain of the driving transistor TDR and the light-emitting device E, and the gate of the fourth switching device Tr4 is connected to the third control line 26. If the light-emitting control signal GEL[i] is transitioned into the low level, the fourth switching device Tr4 is in the ON state, so that the drain of the driving transistor TDR and the anode of the light-emitting device E are electrically conducted. If the light-emitting control signal GEL[i] is transitioned into the high level, the fourth switching device Tr4 is in the OFF state, so that the drain of the driving transistor TDR and the anode of the light-emitting device E are not electrically conducted.

Figure 33:
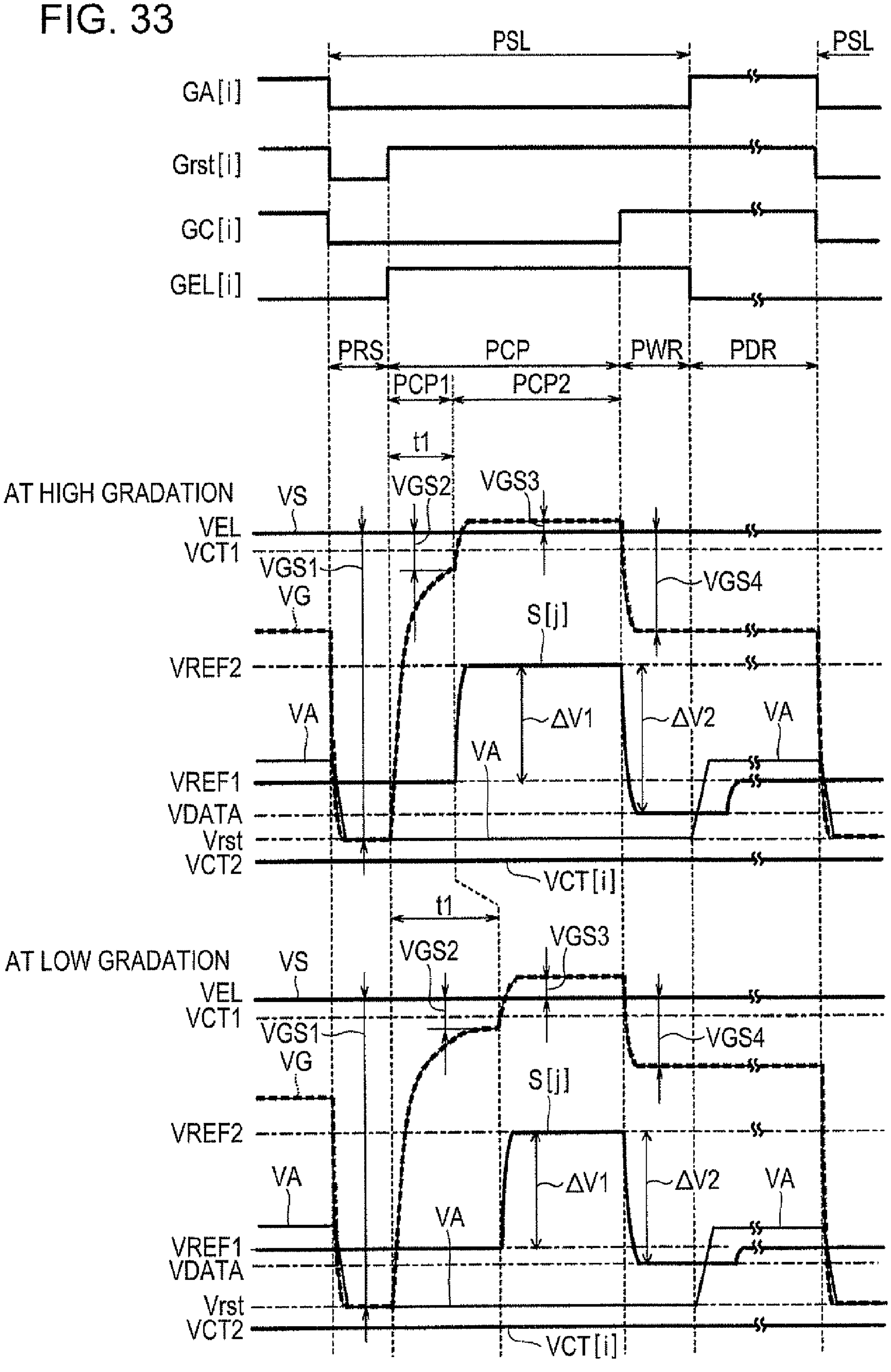
FIG. 33 is a timing chart showing operations of a light-emitting apparatus according to the sixth embodiment of the invention.

FIG. 33 is a timing chart showing operations of a light-emitting apparatus according to the embodiment. The control operations of the embodiment are the same as those of the first embodiment except for the control of the light-emitting control signal GEL[i] and the voltage VCT[i]. As shown in FIG. 33, in the resetting period PRS, the driving circuit 30 sets the light-emitting control signal GFL[i] to the low level. Therefore, as shown in FIG. 32, the fourth switching device Tr4 is transitioned into the ON state, and the drain of the driving transistor TDR is electrically conducted through the fourth switching device Tr4 to the anode of the light-emitting device F. As described above, in the resetting period PRS, since the drain of the driving transistor TDR is electrically conducted through the third switching device Tr3 and the second switching device Tr2 to the reset line 24, the anode of the light-emitting device E is electrically conducted through the fourth switching device Tr4, the third switching device Tr3, and the second switching device Tr2 to the reset line 24. Therefore, as shown in FIG. 33, the voltage VA of the anode of the light-emitting device E together with the drain of the driving transistor TDR is set (reset) to the resetting voltage Vrst.

As shown in FIG. 33, the voltage control circuit 36 sets the voltage VCT[i] output to the feed line 16 to the second voltage VCT2 over all the periods (that is, the resetting period PRS, the compensating period PCP, the writing period PWR, and the driving period P2DR). In addition, the second voltage VCT2 and the resetting voltage Vrst are set so that a voltage difference therebetween (that is, the voltage across the light-emitting device E in the resetting period PES) is sufficiently lower than the threshold voltage VTH_OLED of the light-emitting device E, as expressed by the following Equation (9). Accordingly, in the resetting period PRS, the light-emitting device E is in the OFF state (non-emitting state).

$$Vrst-VCT2 \ll VTH\_OLED \quad (9)$$

As shown in FIG. 33, in the compensating period PCP, the driving circuit 30 sets the light-emitting control signal GEL[i] to the high level. Therefore, since the fourth switching device Tr4 is transitioned into the OFF state, the drain of the driving transistor TDR and the anode of the light-emitting device E are not electrically conducted to each other, and the light-emitting device E is maintained in the OFF state (non-emitting state).

As described above, the sustaining period PCP2 in the compensating period PCP starts, the voltage of the first electrode L1 is changed from the first reference voltage VREF1 to the second reference voltage VREF2. In the embodiment, in the compensating period PCP, since the fourth switching device Tr4 is transitioned into the OFF state, the drain of the driving transistor TDR and the anode of the light-emitting device E are not electrically conducted. The change of the voltage VG just after the start of the sustaining period PCP2 does not depend on the capacitance value (cp2) of the capacitance C2 that is accompanied with the light-emitting device E. Therefore, the change of the voltage VG just after the start of the sustaining period PCP2 corresponds to a voltage (ΔV1·cp0/(cp0+cp1)) that is obtained by dividing the change ΔV1 (=VREF2−VREF1) of the voltage of the first electrode L1 according to a capacitance ratio of the capacitance device C0 and the storage capacitance C1. The gate-source voltage VGS3 of the driving transistor TDR just after the start of the sustaining period PCP2 is expressed by the following Equation (10) instead of Equation (4).

$$VGS3=VGS2-\Delta V1\cdot cp0/(cp0+cp1) \quad (10)$$

As understood from Equations (10) and (4), in the embodiment, the change ΔV1 of the voltage of the first electrode L1 needed for setting the voltage VGS3 to a desired value that is lower than the threshold voltage VTH of the driving transistor TDR becomes smaller than that of the first embodiment. According to the embodiment, there is an advantage in that the change of the signal S[j] in the compensating period PCP can be designed to be smaller than that of the first embodiment. In addition, as understood from Equation (10), in the embodiment, since the voltage VGS3 is set irrespective of the capacitance value (cp2) of the capacitance C2 that is accompanied with the light-emitting device E, even in a case where the capacitance values of the capacitances C2 of the pixel circuits U are not uniform, the values of the voltages VGS3 are not influenced, but variance thereof does not occur. According to the embodiment, there is an advantage in that errors in the driving current IDR caused from the non-uniformity of the capacitance value (cp2) of the capacitance C2 can be suppressed.

As shown in FIG. 33, in the writing period PWR, the driving circuit 30 maintains the light-emitting control signal GEL[i] at the high level. Therefore, the fourth switching device Tr4 is maintained in the OFF state, and the light-emitting device E is maintained in the OFF state (non-emitting state).

As described above, if the writing period PWR starts, the voltage of the first electrode L1 is changed from the second reference voltage VREF2 to the gradation voltage VDATA. The change of the voltage VG just after the start of the writing period PWR corresponds to a voltage (ΔV2·cp0/(cp0+cp1)) that is obtained by dividing the change ΔV2 (=VDATA−VREF2) of the voltage of the first electrode L1 according to a capacitance ratio of the capacitance device C0 and the storage capacitance C1. In the embodiment, the gate-source voltage VGS4 of the driving transistor TDR just after the start of the writing period PWR does not depend on the capacitance value (cp2) of the capacitance C2 that is accompanied with the light-emitting device E, as expressed by the following Equation (11).

$$\begin{aligned} VGS4 &= VGS3 - \Delta V2\cdot cp0/(cp0+cp1) \quad (11)\\ &= VGS2 - \Delta V1\cdot cp0/(cp0+cp1)\} - \\ &\quad \Delta V2\cdot cp0/(cp0+cp1)\\ &= VGS2 + (VREF1 - VDATA)\cdot cp0/(cp0+cp1) \end{aligned}$$

As understood from Equations (11) and (8), in the embodiment, there is an advantage in that the change of the reference voltage VREF1 and the gradation voltage VDATA needed for setting the voltage VGS4 to a desired value corresponding to the gradation value D becomes smaller than that of the second embodiment.

As shown in FIG. 33, in the driving period PDR, the driving circuit 30 sets the light-emitting control signal GEL[i] to the low level. Therefore, the fourth switching device Tr4 is transitioned into the ON state, so that the drain of the driving transistor TDR and the anode of the light-emitting device E are electrically conducted through the fourth switching device Tr4. The current Ids of Equation (3) flows through the fourth switching device Tr4 into the anode of the light-emitting device E, so that the voltage VA is increased, as shown in FIG. 16. If the voltage (=VA−VCT2) across the light-emitting device E approaches the threshold voltage VTH_OLED of the light-emitting device E, the current Ids is supplied as the driving current IDR to the light-emitting device E.

However, if the light-emitting device E emits light in the compensating period PCP or the writing period PWR, there is a problem in that deterioration in pixel contrast occurs. In the aforementioned embodiments (first to third embodiments), since the light-emitting device E is reliably maintained in the OFF state (non-emitting state) in the compensating period PCP and the writing period PWR, there is an advantage in that the deterioration in pixel contrast can be suppressed. In addition, according to the embodiment, as shown in FIG. 33, since the light emitting of the light-emitting device E in the compensating period PCP and the writing period PWR is stopped without change of the voltage VCT[i] of the feed line 16, there is an advantage in that the control of the voltage control circuit 36 can be simplified in comparison with the first and second embodiments.

In addition, according to the aforementioned fourth and fifth embodiments, since the ON and OFF states of the light-emitting device E can be changed by changing the voltage VCT[i] of the feed line 16 (that is, a voltage applied to the other electrode of the light-emitting device E), there is no need for disposing a switching device (for example, the fourth switching device Tr4) for determining whether or not to supply the driving current IDE to the light-emitting device E in the path of the driving current IDR. Therefore, there is an advantage in that the construction of the pixel circuit U can be simplified.

G: Modified Example

The above-mentioned embodiments may be modified in various forms. Examples of detailed aspects of the modifications based on the embodiments will be described in the following section. In addition, two or more aspects may be combined by optionally selecting those from the following examples.

(1) Modified Example 1

Figure 34:
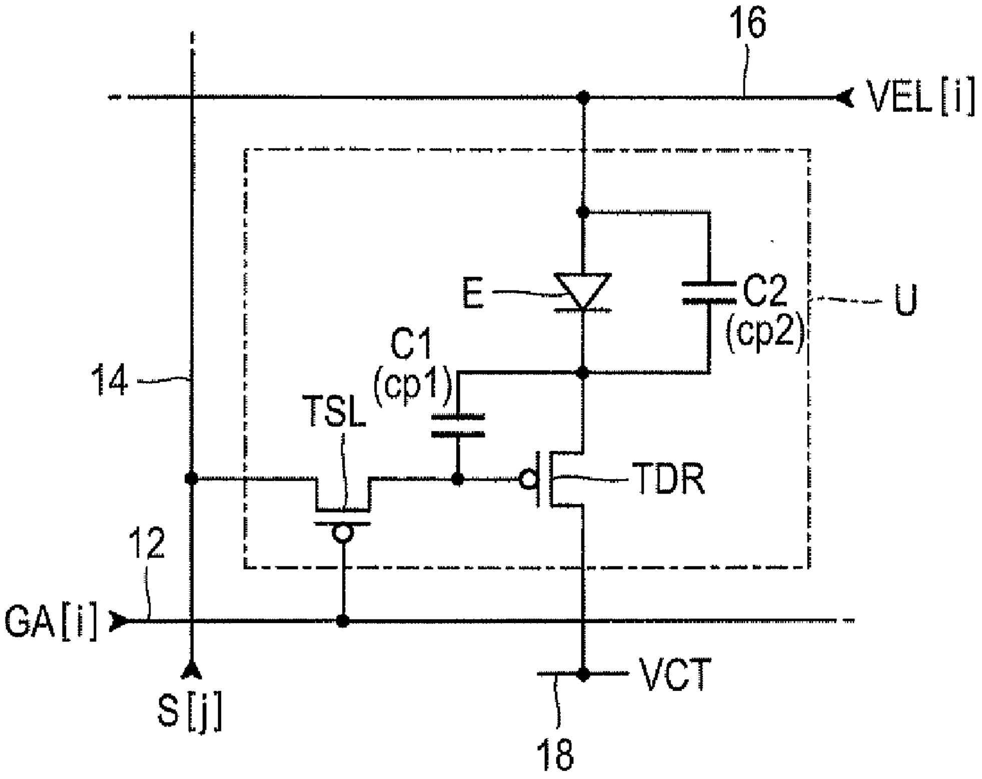
FIG. 34 is a circuit view showing a pixel circuit according to a modified example.

In the aforementioned embodiment, each switch in the pixel circuit U has an arbitrary conductive type. For example, in the first to third embodiments, as shown in FIG. 34, the driving transistor TDR or the selecting switch TSL may have a P-channel type. In the pixel circuit U shown in FIG. 34, the anode of the light-emitting device E is connected to the feed line 18 (voltage VCT) The drain of the driving transistor TDR is connected to the feed line 16 (voltage VEL[i]), and the source thereof is connected to the cathode of the light-emitting device E. Similarly to the construction shown in FIG. 2, the storage capacitance C1 is interposed between the gate and source of the driving transistor TDR, and the selecting switch TSL is interposed between the gate of the driving transistor TDR and the signal line 14. In this manner, in comparison with the case of using the N-channel driving transistor TDR, in case of using the P-channel driving transistor TDR, the voltage relationship (that is, the size of voltage) is inverted, but the basic operations thereof are the same as those of FIG. 3. Therefore, the description of the operations is omitted. In addition, similarly to the third embodiment, the construction that the control switch TCR is disposed in the path of the current Ids flown into the driving transistor TDR of FIG. 34 (for example, between the drain of the driving transistor TDR and the feed line 18) may be employed.

In addition, in the fourth to sixth embodiments, for example, all or some of the first to fourth switching devices Tr1 to Tr4 may be constructed with an N-channel transistor.

(2) Modified Example 2

The construction that the signal line 14 for applying the gradation voltage VDATA to the pixel circuit U is also used for controlling the operations of the pixel circuit U in the compensating period PCP or the resetting period PRS is not a necessary construction of the invention. It will be described more in detail as follows.

In the aforementioned embodiments, the compensating operation is stopped by changing the signal S[j] of the signal line 14 from the voltage VREF1 to the voltage VREF2. However, a method of stopping the compensating operation may be suitably modified. In the first to third embodiments, for example, at the starting point of the sustaining period PCP2, the selecting switch TSL may be transitioned into the OFF state, and a line applied with the reference voltage VREF2 may be connected to the gate of the driving transistor TDR. In the fourth to sixth embodiments, for example, at the starting point of the sustaining period PCP2, the first switching device Tr1 may be transitioned into the OFF state, and a line applied with the second reference voltage VREF2 may be connected to the first electrode L1 of the capacitance device C0.

In addition, in the first to third embodiments, during the performing of the compensating operation in the operating period PCP1, the reference voltage VREF1 (signal S[j]) is applied from the signal line 14 to the gate of the driving transistor TDR. However, during the performing of the compensating operation, a method of maintaining the gate voltage of the driving transistor TDR may be suitably modified. For example, in the operating period PCP1, the selecting switch TSL may be transitioned into the OFF state, and a line applied with the reference voltage VREF1 may be connected to the gate of the driving transistor TDR. The same description is also made for the operation of applying the reference voltage VREF1 to the gate of the driving transistor TDR in the resetting period PRS. For example, in the resetting period PRS, the selecting switch TSL may be transitioned into the OFF state, and a line applied with the reference voltage VREF1 may be connected to the gate of the driving transistor TDR.

In addition, in the fourth to sixth embodiments, during the performing of the first compensating operation in the operating period PCP1, the first reference voltage VREF1 (signal S[j]) is applied from the signal line 14 to the first electrode L1. However, a method of maintaining the voltage of the first electrode L1 during the performing of the first compensating operation may be suitably modified, For example, in the operating period PCP1, the first switching device Tr1 is transitioned into the OFF state and a line applied with the first reference voltage VREF1 may be connected to the first electrode L1.

Moreover, in the aforementioned embodiments, according to the construction that the signal line 14 (signal S[j]) is also used for driving the pixel circuit U in the resetting period PRS or the compensating period PCP, it is possible to obtain a particular effect in that the construction of the device unit 10 can be simplified in comparison with the construction that a line for driving the pixel circuit U in the resetting period PRS or the compensating period PCP is formed to be separated from the signal line 14.

(3) Modified Example 3

In the sixth embodiment, in the resetting period PRS, the fourth switching device Tr4 is in the ON state. However, for example, in the resetting period PRS, the fourth switching device Tr4 may be in the OFF state, and only in the driving period PDR, the fourth switching device Tr4 may be in the ON state.

(4) Modified Example 4

In the sixth embodiment, as shown in FIG. 33, in the writing period PWR, the diode connection of the driving transistor TDR is released. However, similarly to the second embodiment, in the writing period PWR, the second compensating operation may be performed by allowing the driving transistor TDR to be in the diode connection state.

(5) Modified Example 5

In the above embodiments, in a construction in which a plurality of the pixel circuits U are arrayed in a matrix, in a case where the pixel circuits U are driven in units of row in a time division manner, there is a need for the selecting switch TSL or the first switching device Tr1 to be disposed in each of the pixel circuits U. However, for example, in a construction in which a plurality of the pixel circuits U are arrayed in only one row in the X direction, since the operation of selecting a plurality of rows in the time division manner is not needed, there is no need for the selecting switch TSL or the first switching device Tr1 to be disposed in each of the pixel circuits U. For example, a light-emitting apparatus 100 where a plurality of the pixel circuits U are arrayed in only one row may be suitably adapted to an exposure apparatus that exposes an image carrier on a photosensitive drum or the like, in an electro-photographic image forming apparatus (printing apparatus).

(6) Modified Example 6

Figure 35:
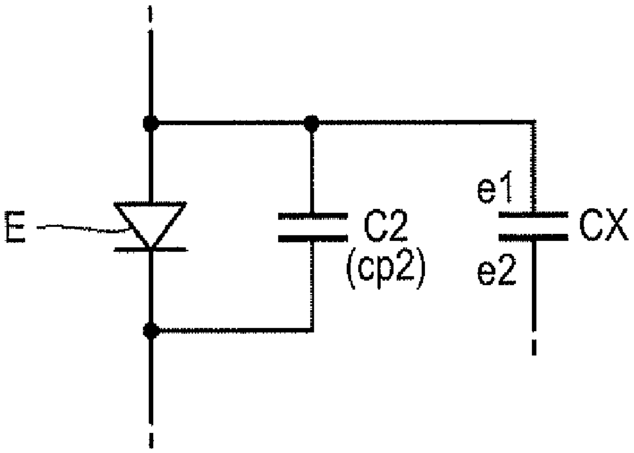
FIG. 35 is a circuit view showing a pixel circuit according to a modified example.

In the above embodiments, the capacitance C2 accompanied with the light-emitting device E is used. However, as shown in FIG. 35, a capacitance CX together with the capacitance C2 may be suitably used. An electrode e1 of the capacitance CX is connected to the path that connects driving transistor TDR and the light-emitting device E (that is, between the drain and source of the driving transistor TDR). An electrode e2 of the capacitance CX is connected to a line that is applied with a predetermined voltage (for example, in the first to third embodiments, the feed line 18 that is applied with the voltage VCT). In this construction, the capacitance value cp2 in Equation (4) or (5) becomes a sum of the capacitance CX and the capacitance C2 of the light-emitting device E. Accordingly, the voltage VGS3 of Equation (4) or the voltage VGS4 of Equation (5) can be adjusted according to the capacitance CX.

(7) Modified Example 7

The organic EL device is just an example of the light-emitting apparatus. For example, the invention may be applied to a light-emitting apparatus having light-emitting apparatuses, such as inorganic EL devices or LED (Light Emitting Diode) elements, arranged therein similarly to the above aspects. The light-emitting apparatus according to the embodiments of the invention is a component of which the gradation (luminance) is changed by supplying current.

H: Application Examples

Figure 36:
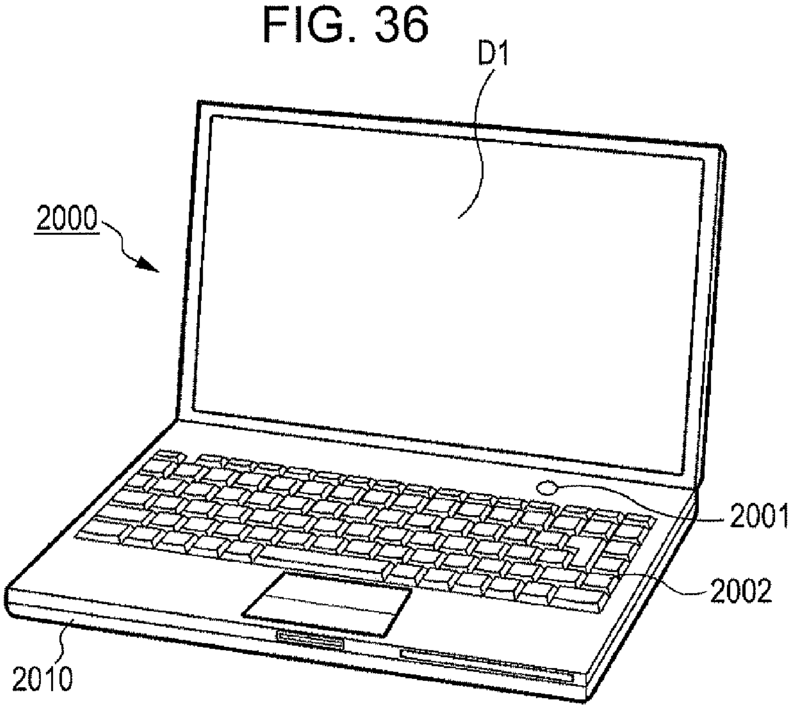
FIG. 36 is a perspective view showing an electronic apparatus (a personal computer).
Figure 37:
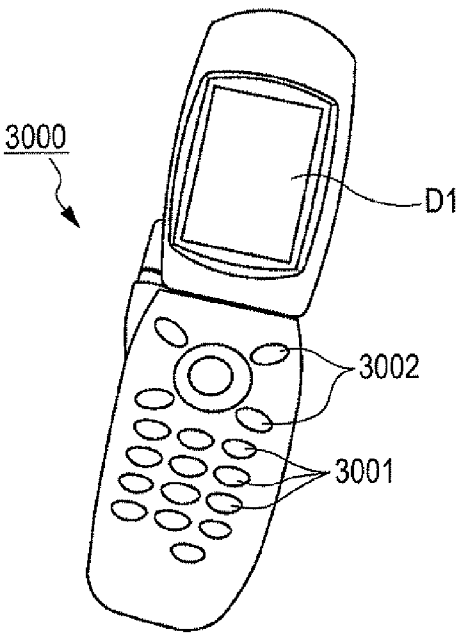
FIG. 37 is a perspective view showing an electronic apparatus (a mobile phone).
Figure 38:
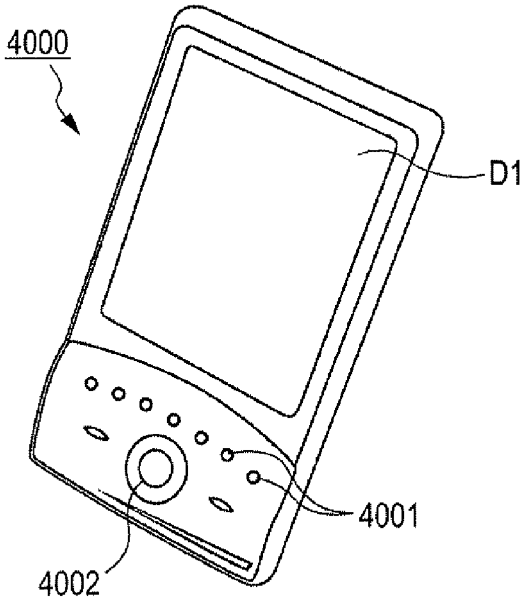
FIG. 38 is a perspective view showing an electronic apparatus (a portable information terminal).

Next, electronic apparatuses using the light-emitting apparatus 100 according to the above aspect will be described. FIG. 36 to FIG. 38 show embodiments of electronic apparatuses using the light-emitting apparatus 100 as a display device.

FIG. 36 is a perspective view illustrating a configuration of a mobile type personal computer using the light-emitting apparatus 100. The personal computer 2000 includes the light-emitting apparatus 100 for displaying various images and a main body 2010 equipped with a power switch 2001 and a keyboard 2002. The light-emitting apparatus 100 uses an organic EL device as the light-emitting apparatus E, whereby it is possible to display a visible screen with a wide viewing angle.

FIG. 37 is a perspective view illustrating a configuration of a mobile phone using the light-emitting apparatus 100. The mobile phone 3000 includes a plurality of operation buttons 3001 and scroll buttons 3002, and the light-emitting apparatus 100 for displaying various images. By operating the scroll buttons 3002, the screen displayed on the light-emitting apparatus 100 is scrolled.

FIG. 38 is a perspective view illustrating a configuration of a portable information terminal (PDA: Personal Digital Assistants) using the light-emitting apparatus 100. The portable information terminal 4000 includes a plurality of operation buttons 4001 and a power switch 4002, and the light-emitting apparatus 100 for displaying various images. When the power switch 4002 is operated, various information such as an address book and a schedule note are displayed on the light-emitting apparatus 100.

Examples of electronic apparatuses using the light-emitting apparatus according to the embodiments of the invention include not only the apparatuses shown in FIGS. 36 to 38 but also include: a digital still camera, a television; a video camera; a car navigation system; a pager; an electronic personal organizer; an electronic paper; an electronic calculator; a word processor; a workstation; a video telephone; a POS terminal; a printer; a scanner; a copier; a video player; a device with a touch panel; and the like. A use of the light-emitting apparatus according to the embodiment of the invention is not limited to display of an image. For example, the light-emitting apparatus according to the embodiment of the invention may be used as an exposure device for forming a latent image on a photosensitive drum by performing an exposure process in an electrophotographic type image forming apparatus.

The entire disclosure of Japanese Patent Application Nos: 2008-209520, filed Aug. 18, 2008 and 2008-247524, filed Sep. 26, 2008 are expressly incorporated by reference herein.

What is claimed is:

1. A method of driving a pixel circuit including a light-emitting device, a driving transistor serially connected to the light-emitting device, and a storage capacitance interposed between a path between the light-emitting device and the driving transistor and a gate of the driving transistor, comprising:

turning on the driving transistor by resetting a voltage across the storage capacitance in a resetting period;

performing a compensating operation of asymptotically causing the voltage across the storage capacitance to converge with a voltage corresponding to a threshold voltage of the driving transistor by applying a first reference voltage to the gate of the driving transistor, over a time duration variably set according to a gradation value designated to the pixel circuit, in a compensating period after the elapse of the resetting period;

changing the voltage across the storage capacitance from a voltage set by the compensating operation to a voltage corresponding to the gradation value by applying a gradation voltage corresponding to the gradation value from a signal line to the gate of the driving transistor, in a writing period after the elapse of the compensating period; and supplying a driving current corresponding to the voltage across the storage capacitance to the light-emitting device by stopping applying a voltage to the gate of the driving transistor, in a driving period after the elapse of the writing period, wherein in the compensating period, the compensating operation performed by applying the first reference voltage from the signal line to the gate of the driving transistor, and the compensating operation is stopped by changing the first reference voltage of the signal line into a second reference voltage to transition the driving transistor into an OFF state.

2. The method according to claim 1, wherein the time duration of the compensating operation in the compensating period is set so that the time duration of the compensating operation is decreased in an inverse proportion to an increase in a change of a gate voltage of the driving transistor due to the application of the gradation voltage.

3. The method according to claim 1, wherein, when the gradation value is lower than a predetermined value, the time duration of the compensating operation is set to a predetermined time that does not depend on the gradation value.

4. The method according to claim 1, wherein, in the writing period, a path of a current flowing in the driving transistor is blocked.

5. A light-emitting apparatus comprising:

a pixel circuit including a light-emitting device, a driving transistor serially connected to the light-emitting device, and a storage capacitance interposed between a path between the driving transistor and the light-emitting device and a gate of the driving transistor; and a driving circuit that drives the pixel circuit, wherein the driving circuit is configured to:

turn on the driving transistor by resetting a voltage across the storage capacitance in a resetting period;

perform a compensating operation of asymptotically causing the voltage across the storage capacitance to converge with a voltage corresponding to a threshold voltage of the driving transistor by applying a first reference voltage to the gate of the driving transistor, over a time duration variably set according to a gradation value designated to the pixel circuit, in a compensating period after the elapse of the resetting period;

change the voltage across the storage capacitance from a voltage set by the compensating operation to a voltage corresponding to the gradation value by applying a gradation voltage corresponding to the gradation value from a signal line to the gate of the driving transistor, in a writing period after the elapse of the compensating period; and supply a driving current corresponding to the voltage across the storage capacitance to the light-emitting device by stopping applying a voltage to the gate of the driving transistor, in a driving period after the elapse of the writing period, wherein in the compensating period, the compensating operation is performed by applying the first reference voltage from the signal line to the gate of the driving transistor, and the compensating operation is stopped by changing the first reference voltage of the signal line into a second reference voltage to transition the driving transistor into an OFF state.

6. An electronic apparatus having the light-emitting apparatus according to claim 5.

7. A light-emitting apparatus comprising:

a pixel circuit; and a driving circuit that drives the pixel circuit, wherein the pixel circuit includes:

a capacitance device having a first electrode and a second electrode;

a P-channel driving transistor of which a gate is connected to the second electrode;

a light-emitting device;

a first switching device interposed between a signal line and the first electrode;

a second switching device interposed between the gate of the driving transistor and a reset line to which a resetting voltage for resetting a gate voltage of the driving transistor is applied; and a third switching device interposed between the gate and drain of the driving transistor, and wherein the driving circuit is configured to:

allow the second switching device to be in an ON state in a resetting period;

perform a compensating operation of setting a voltage applied to the signal line to a first reference voltage by allowing the second switching device to be in an OFF state and of asymptotically causing a gate-source voltage of the driving transistor to converge with a threshold voltage of the driving transistor by allowing the first switching device and the third switching device to be in an ON state, over a time duration variably set according to a gradation value of the pixel circuit, in a compensating period after the elapse of the resetting period;

maintain the first switching device in the ON state and sets the voltage applied to the signal line to a gradation voltage corresponding to the gradation value, in a writing period after the elapse of the compensating period; and allow the first switching device to be in an OFF state, in a driving period after the elapse of the writing period, wherein in the compensating period, the compensating operation is performed by applying the first reference voltage from the signal line to the gate of the driving transistor, and the compensating operation is stopped by changing the first reference voltage of the signal line into a second reference voltage to transition the driving transistor into an OFF state.

8. The light-emitting apparatus according to claim 7, further comprising a fourth switching device that is disposed in a path of the driving current, wherein the driving circuit supplies the driving current to the light-emitting device by allowing the fourth switching device to be in an OFF state in the compensating period and the writing period and allowing the fourth switching device to be in an ON state in the driving period.

* * * * *